United States Patent
Tsukamoto et al.

(10) Patent No.: US 10,525,906 B2
(45) Date of Patent: Jan. 7, 2020

(54) BRANCH STRUCTURE AND WIRE HARNESS

(71) Applicant: Yazaki Corporation, Tokyo (JP)

(72) Inventors: Masashi Tsukamoto, Makinohara (JP); Daiyu Nakajima, Makinohara (JP); Jun Kimura, Makinohara (JP); Mihoko Sowa, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 104 days.

(21) Appl. No.: 15/787,128

(22) Filed: Oct. 18, 2017

(65) Prior Publication Data
US 2018/0118135 A1  May 3, 2018

(30) Foreign Application Priority Data

Oct. 27, 2016  (JP) ................................. 2016-210510

(51) Int. Cl.
*B60R 16/02* (2006.01)
*B60R 16/03* (2006.01)
(Continued)

(52) U.S. Cl.
CPC ...... *B60R 16/0207* (2013.01); *B60R 16/0215* (2013.01); *B60R 16/03* (2013.01);
(Continued)

(58) Field of Classification Search
None
See application file for complete search history.

(56) References Cited

U.S. PATENT DOCUMENTS 5,709,566 A * 1/1998 Tsuji .................... H01R 4/2429
439/397
6,392,148 B1 * 5/2002 Ueno .................. B60R 16/0215
174/117 F
(Continued)

FOREIGN PATENT DOCUMENTS

JP 61-123618 U 8/1986
JP 6-28727 Y2 8/1994
(Continued)

OTHER PUBLICATIONS

Communication dated Dec. 25, 2018, issued by the Japanese Patent Office in counterpart Japanese Patent Application No. 2016-210510.

*Primary Examiner* — Jared Fureman
*Assistant Examiner* — Joel Barnett
(74) *Attorney, Agent, or Firm* — Sughrue Mion, PLLC

(57) ABSTRACT

A branch structure in which a branch harness is connected to a trunk harness includes connecting terminals. The trunk harness includes a plurality of trunk lines which are parallel-arranged. The branch harness includes a plurality of branch lines. The connecting terminals are respectively connected to the plurality of the trunk lines so as to electrically connect the plurality of the branch lines to the plurality of the trunk lines respectively. The trunk lines include connecting parts recessed in a radial direction. The connecting parts are arranged along an arrangement direction of the plurality of the trunk lines. The connecting terminals respectively includes connecting plate parts connected to the connecting parts in surface contact.

5 Claims, 29 Drawing Sheets

(51) Int. Cl.
    *H01R 13/66*     (2006.01)
    *H01R 4/02*     (2006.01)
    *H01R 4/10*     (2006.01)
    *H01R 11/11*     (2006.01)

(52) U.S. Cl.
    CPC ......... *H01R 13/6691* (2013.01); *H01R 4/023* (2013.01); *H01R 4/10* (2013.01); *H01R 11/11* (2013.01)

(56) References Cited

U.S. PATENT DOCUMENTS

| | | | |
|---|---|---|---|
| 2001/0010985 A1* | 8/2001 | Kasai | H01R 9/2458 439/638 |
| 2002/0151197 A1* | 10/2002 | Kawakita | H01R 9/226 439/76.2 |
| 2014/0103715 A1* | 4/2014 | Ito | B60R 16/0207 307/24 |
| 2015/0349471 A1 | 12/2015 | Maki et al. | |
| 2016/0036151 A1* | 2/2016 | Tominaga | H01B 7/009 439/884 |
| 2016/0250984 A1 | 9/2016 | Gottschlich et al. | |

FOREIGN PATENT DOCUMENTS

| | | |
|---|---|---|
| JP | 2015-227089 A | 12/2015 |
| JP | 2016-147558 A | 8/2016 |

\* cited by examiner

BRANCH STRUCTURE AND WIRE HARNESS

CROSS REFERENCE TO RELATED APPLICATIONS

This application claims priority from Japanese Patent Application No. 2016-210510 filed on Oct. 27, 2016, the entire contents of which are incorporated herein by reference.

BACKGROUND OF THE INVENTION

Field of the Invention

The invention relates to a branch structure and a wire harness.

Description of Related Art

For example, a wire harness for a vehicle is connected to the respective electrical components of the vehicle in such a manner that branch harnesses are connected to a trunk harness consisting of aggregated trunk lines such as a power line and a ground line. As a technology for branching the branch harnesses in such a manner that the branch harnesses are connected to the trunk harness, there is known a technology which, using a branch mechanism having press-contact terminals, connects the trunk lines of a trunk harness to branch lines by pressing the trunk lines against the press-contact terminals of the branch mechanism (see, for example, the patent document 1: JP-A-2015-227089).
[Patent Document 1] JP-A-2015-227089

According to a related art, in a branch mechanism having press-contact terminals, since pressure connection is attained by pressing a trunk line into between a pair of press-contact blades, the pressure contact blades are arranged on both sides of the trunk line. Therefore, when branch harnesses are branched using the press-contact terminals, the distance between the parallel arranged trunk lines of the trunk harness is large, whereby a space occupied by the branch mechanism increases.

Also, in the branch structure using the press-contact terminals, an electric wire is pushed into between the press-contact blades and is thereby contacted therewith. Therefore, in a trunk line such as a power line through which a large current flows, there is a fear that connection reliability can be lowered due to lack of contact area.

Further, recently, as the trunk line of the trunk harness of a wire harness for a vehicle, for the purpose of weight reduction and handling improvement etc., there has been used a rigid line composed of a single wire made of aluminum etc. However, the press-contact blades of the press-contact terminal are hard to bite into the single wire constituting the rigid line. Thus, it is desired to develop a branch structure replacing the structure using the branch mechanism with the press-contact terminals.

SUMMARY

One or more embodiments provides a branch structure and a wire harness which can secure high connection reliability, while saving space.

In an aspect (1), one or more embodiments provide a branch structure in which a branch harness is connected to a trunk harness. The branch structure includes connecting terminals. The trunk harness includes a plurality of trunk lines parallel-arranged and composed of routing materials with bar conductors. The branch harness includes a plurality of branch lines. The connecting terminals are respectively connected to the plurality of the trunk lines, so as to electrically connect the plurality of the branch lines to the plurality of the trunk lines respectively. The trunk lines include connecting parts recessed in a radial direction. The connecting parts are arranged along an arrangement direction of the plurality of the trunk lines. The connecting terminals respectively includes connecting plate parts connected to the connecting parts in surface contact.

In an aspect (2), the connecting terminals are mounted on a circuit board arranged along the arrangement direction of the plurality of the trunk lines. A first connector mounted on the circuit board is connected to a second connector on the branch harness and the connecting terminals are conducted to the plurality of the branch lines.

In an aspect (3), the connecting terminals respectively include bus bar parts extending from the connecting plate parts along the arrangement direction of the plurality of the trunk lines. A third connector mounted in the ends of the bus bar parts is connected to a second connector on the branch harness and the connecting terminals are conducted to the plurality of the branch lines.

In an aspect (4), a wire harness includes a trunk harness including at least a power supply line arranged on a vehicle body, the branch harness connected to an auxiliary equipment of a vehicle, and the plurality of control boxes arranged dispersedly along the trunk harness. The plurality of the control boxes respectively includes control parts which distribute the power of the power supply line to the branch harness connected to the trunk harness. The plurality of the control boxes connect the branch harness to the trunk harness in the branch structure according to any one of the above aspect (1) to (3).

According to the aspect (1) configuration, the trunk lines and branch lines are electrically connected to each other in such a manner that the connecting plate parts of the connecting terminals are connected to the connecting parts arranged toward the arrangement direction of the trunk lines and recessed in the radial direction. Therefore, since the protrusion of the connecting terminals used to connect the branch lines to the trunk lines toward the arrangement direction of the trunk lines can be suppressed, the distance between the trunk lines can be reduced as much as possible, thereby enabling space saving of the branch portions.

Also, since the connecting plate parts of the connecting terminals are connected to the connecting parts of the trunk lines in surface contact, a large contact area can be secured and thus high connection reliability can be secured.

According to the aspect (2) configuration, the connecting terminals connected to the trunk lines and branch lines are conducted to each other through the conductor patterns of the circuit board arranged along the arrangement direction of the trunk lines. Therefore, communization of the connecting terminals and simplification of the shape thereof can be achieved, thereby enabling reduction of cost.

According to the aspect (3) configuration, since the bus bar parts extending from the connecting plate parts are formed in the connecting terminals, the connecting terminals connected to the trunk lines and branch lines can be conducted to each other without using the circuit board. This can reduce the number of parts, thereby enabling reduction of cost.

According to the aspect (4) configuration, using the wire harness arranged on the vehicle body while including at least the power supply line having a predetermined current capacity and the branch lines for connecting the auxiliary equipment to the trunk lines through the plurality of control boxes dispersedly arranged along the trunk harness, a wire harness having a simple structure can be configured; and also, it is possible to provide a wire harness which can save the space in the connecting portions of the trunk harness with respect to the branch harnesses and also can provide high connection reliability.

According to one or more embodiments, a branch structure and a wire harness can secure high connection reliability, while saving space.

The invention has been described in brief heretofore. Further, when the mode, which is described as follows, for carrying out the invention is read through with reference to the accompanying drawings, the details of the invention can be further clarified.

BRIEF DESCRIPTION OF THE DRAWINGS

FIG. 13 shows the branch portions in the branch box used in the modification 1-4.

DETAILED DESCRIPTION

Description is given below of embodiments according to the invention with reference to the drawings.

Firstly, description is given of the configuration of a wire harness according to the present embodiment.

Figure 1:
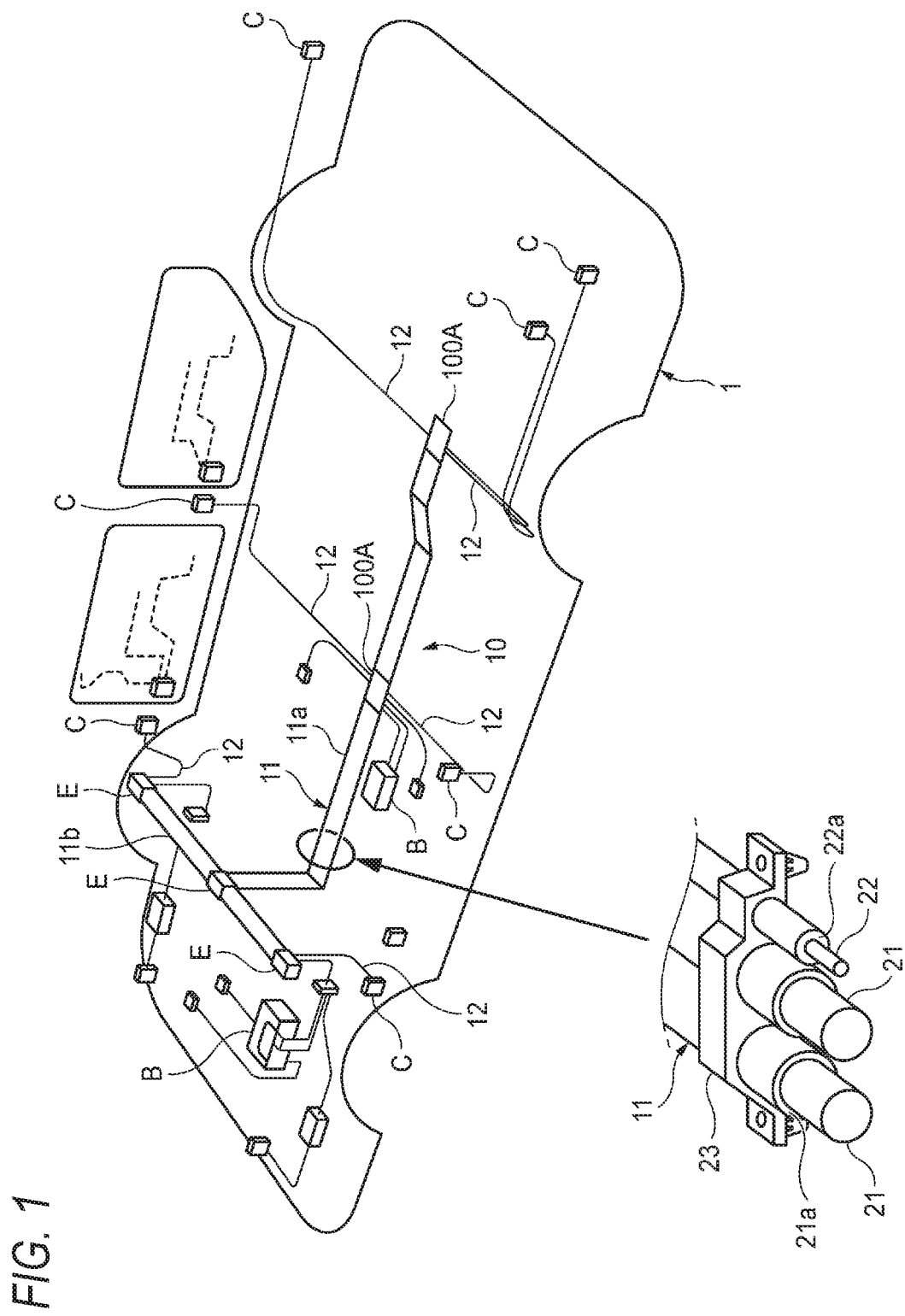
FIG. 1 is a schematic perspective view of a vehicle body on which a wire harness according to an embodiment of the invention is arranged.

FIG. 1 is a schematic perspective view of a vehicle body on which a wire harness according to the embodiment of the invention is arranged.

As shown in FIG. 1, a wire harness 10 is used as a power supply path for supplying the power of a power source B such as an in-vehicle main battery and a sub-battery to electrical components used as the accessories of the respective parts of a vehicle body 1, a transmission path necessary for transmitting and receiving signals to and from the electrical components, and the like.

The wire harness 10 includes a trunk harness 11 and plurality of branch harnesses 12. The trunk harness 11 is configured such that trunk lines 21 such as a power line and a ground line and signal lines 22 such as a communication line are arranged in parallel to each other and are bundled together by a fixing member 23. The trunk harness 11 is formed in a simple shape such as the shape of the back bone of the vehicle body 1. The trunk line 21 is an electric wire in which a single wire made of conductive metal material such as aluminum is covered with a coating 21a, and is a rigid body line composed of a round bar having a circular cross section. The trunk line 21 composed of a rigid body line made of aluminum has high rigidity when compared with a stranded line obtained by twisting a plurality of strands, and also is light when compared with a copper line. Also, the trunk line 21 composed of a rigid body line made of aluminum provides a cable which can be bent in all directions, that is, has a high degree of freedom in a routing path. Here, as the signal line 22, there is used, for example, a stranded line in which the outer periphery of a core wire obtained by stranding wires made of, for example, copper or copper alloy is covered with a coating 22a.

The trunk harness 11 is mainly divided to a floor trunk harness 11a and an instrument panel trunk harness 11b. The floor trunk harness 11a is arranged along the floor of a passenger compartment substantially in the central part of the vehicle body 1 in the left-right direction thereof so as to extend in the front-rear direction of the vehicle body 1; whereas, the instrument panel trunk harness 11b is arranged linearly toward the left-right direction in a portion along the surface of a dash panel (not shown) so as to extend substantially in parallel to a lean hose.

The branch harness 12 is connected to the trunk harness 11. Connectors C are connected to the end of the branch harness 12, and the connectors of electrical components mounted in the respective parts of the vehicle body 1 can be connected to the connectors C. Also, various kinds of control boxes E are connected to the trunk harness 11. This configuration enables power supply from the power source B and signal distribution from the respective control boxes E to the electrical components of the vehicle body 1 respective parts.

In the above wire harness 10, in the connecting portion between the trunk harness 11 and branch harness 12, there is arranged a branch box 100A. And, the trunk harness 11 and branch harness 12 are connected to each other by the branch box 100A.

Next, description is given of a branch structure in the branch box 100A. Here, description is given of an example in which four branch lines 71 of the branch harness 12 are connected to four parallel-arranged trunk lines 21 of the trunk harness 11.

First Embodiment

Figure 2:
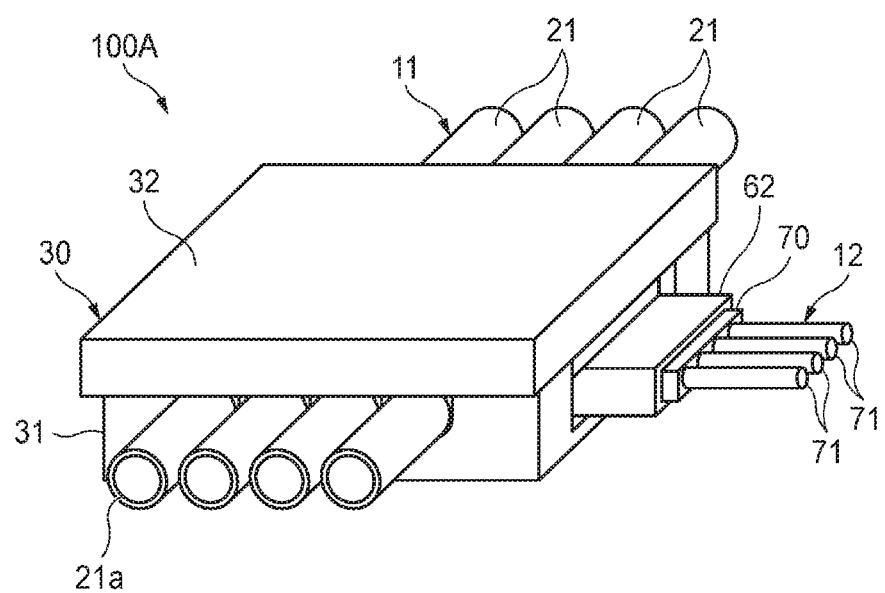
FIG. 2 is a perspective view of a branch box used in a branch structure according to a first embodiment.
Figure 3:
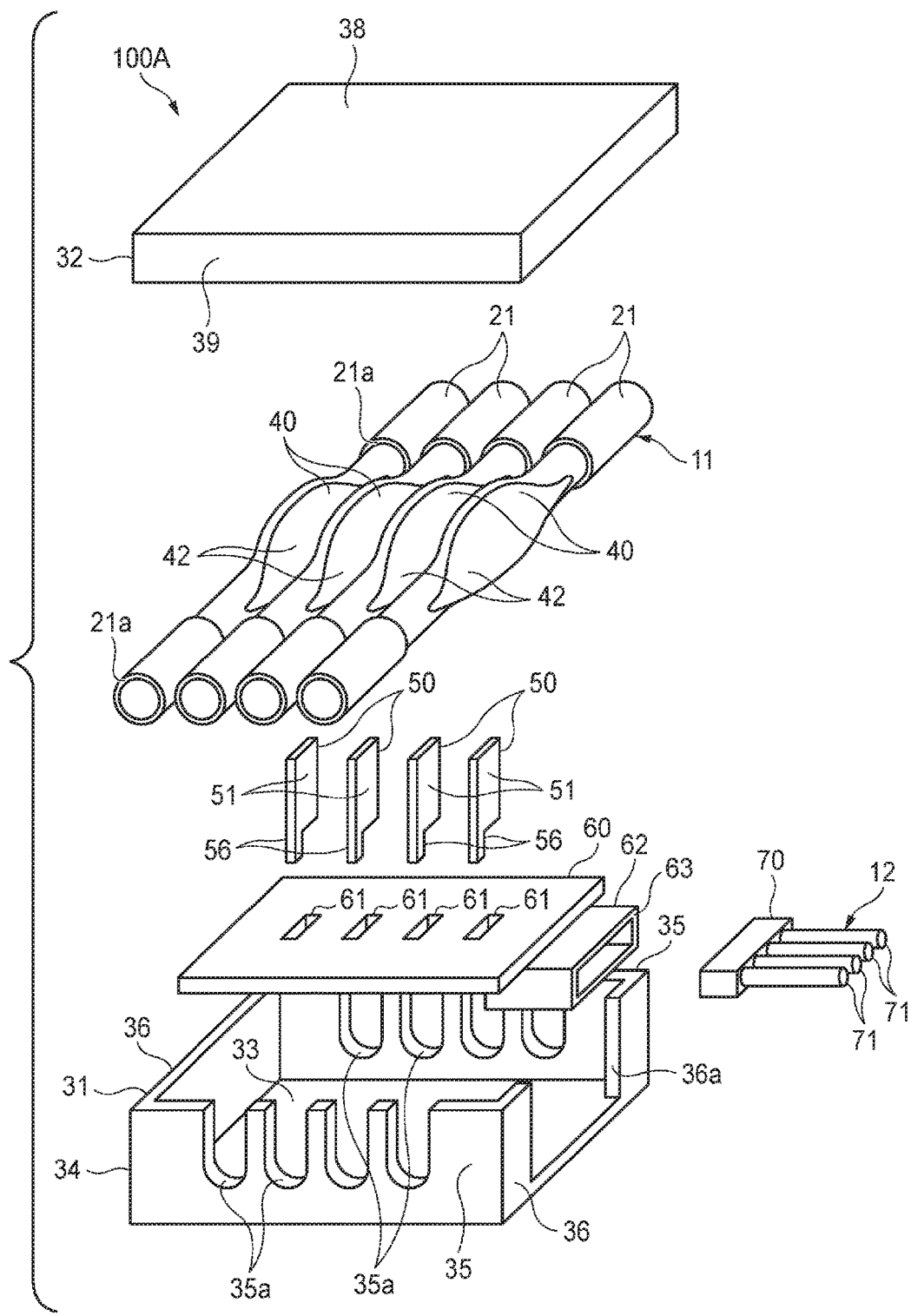
FIG. 3 is an exploded perspective view of the branch box used in the branch structure of the first embodiment.
Figure 4:
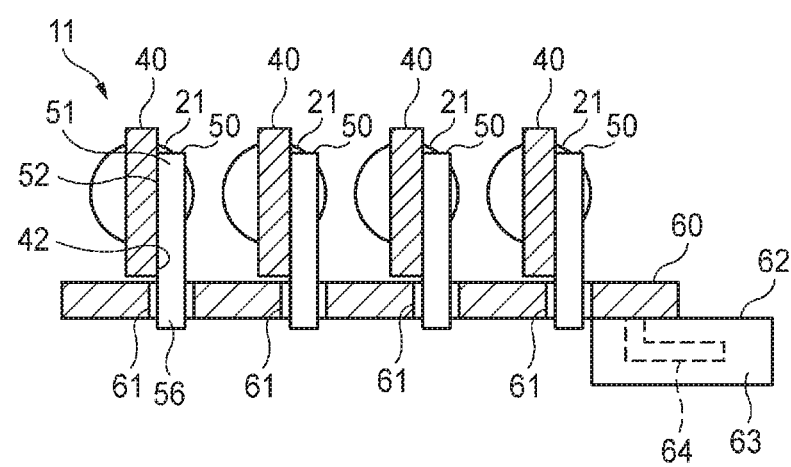
FIG. 4 is a section view of branch portions in the branch box used in the branch structure of the first embodiment.

FIG. 2 is a perspective view of a branch box used in a branch structure according to a first embodiment. FIG. 3 is an exploded perspective view of the branch box used in the branch structure of the first embodiment. FIG. 4 is a section view of branch portions in the branch box used in the branch structure of the first embodiment.

As shown in FIGS. 2 and 3, the branch box 100A includes a storage case 30. The storage case 30 is composed of a lower case 31 and a cover 32. The lower case 31 and cover 32 are respectively formed of insulating resin.

The lower case 31 includes a rectangular bottom plate part 33 and a peripheral wall part 34 formed on the peripheral edge of the bottom plate part 33. The peripheral wall part 34 includes two oppositely disposed end face plate portions 35 and two oppositely disposed side surface plate portions 36. The two end face plate portions 35 respectively have a plurality of (in this embodiment, four) trunk line insertion recesses 35a at their opposed positions. Also, one of the side surface plate portions 36 has a connector storage recess 36a.

The cover 32 includes a rectangular upper face plate part 38 and a peripheral wall 34 formed on the peripheral edge of the upper face plate part 38. The cover 32 is mounted onto the lower case 31 from above and is fixed thereto. Thus, the cover 32 is placed on the lower case 31 in such a manner that the peripheral wall 39 of the cover 32 covers the upper periphery of the peripheral wall part 34.

As shown in FIGS. 2 to 4, a plurality of (in this embodiment, four) trunk lines 21 constituting the trunk harness 11 are inserted into a storage case 30. Within the storage case 30, the coatings 21a of the trunk lines 21 are removed respectively. In the parts of the trunk lines 21 where the coatings 21a are removed, there are formed connecting parts 40 respectively. Each connecting part 40 is formed by pressing its associated trunk line 21 from both sides to be recessed in the radial direction into plastic deformation. Thus, the connecting part 40 is formed into a flat shape having flat surfaces on both sides. One surface of the connecting part 40 serves as a connecting surface 42, and the trunk line 21 is arranged such that the connecting part 40 having the connecting surface 42 is directed toward the arrangement direction of the trunk line 21. Thus, the connecting surface 42 of the connecting part 40 is arranged along the vertical direction perpendicular to the arrangement direction of the trunk line 21.

Also, within the storage case 30, there are provided a plurality of connecting terminals 50. Each connecting terminal 50 has a connecting plate part 51 composed of a flat plate. This connecting plate part 51 has a pin portion 56 extending downward. In each connecting terminal 50, one surface of the connecting plate part 51 is used as a bonding surface 52 composed of a flat surface capable of being surface contacted with the connecting surface 42 of the trunk line 21, while the contact surface 52 is connected to the connecting surface 42 of the trunk line 21. The connecting surface 42 and bonding surface 52 can be connected together by soldering or by ultrasonic bonding.

Further, within the storage case 30, a circuit board 60 constituted of a hard printed wiring circuit board is arranged along the arrangement direction of the trunk line 21. This circuit board 60 has insertion holes 61 into which the pin portions 56 of the connecting terminals 50 can be inserted. The insertion holes 61 are formed in the circuit board 60 at the same pitch of the arrangement of the trunk lines 21. And, with the pin portions 56 inserted into the insertion holes 61 respectively, the connecting terminals 50 are soldered to conductor patterns (not shown) formed in the circuit board 60 and thus are electrically connected thereto.

The circuit board 60 includes a connector 62 in one side edge thereof. The connector 62 has a housing 63 within which there is provided a connecting pin 64. The connecting pin 64 of the connector 62 is electrically connected to the conductor pattern of the circuit board 60. The connector 62 is arranged in a connector storage recess 36a formed in the lower case 31 of the storage case 30, while the housing 63 is exposed in part to the outside from the storage case 30.

To the connector 62, there can be connected a branch side connector 70 provided on the branch harness 12. The branch side connector 70 stores therein terminals (not shown) connected to the ends of the branch lines 71 constituting the branch harness 12. When the branch side connector 70 is connected to the connector 62, the terminals of the branch side connector 70 are electrically connected to the connecting pin 64 of the connector 62. Thus, the branch lines 71 constituting the branch harness 12 are electrically connected to the trunk lines 21 of the trunk harness 11 through the conductor patterns of the circuit board 60 and connecting terminals 50.

Thus, according to the branch structure of the first embodiment using the above branch box 100A, the connecting plate parts 51 of the connecting terminals 50 are boned to the connecting parts 40 arranged toward the arrangement direction of the trunk lines 21 and recessed in the radial direction, whereby the trunk lines 21 and branch lines 71 are electrically connected to each other. This configuration can suppress the arrangement direction protrusion of the connecting parts 50 used to connect the branch lines 71 to the trunk lines 21 and thus can reduce the distance between the trunk lines 21 as much as possible, thereby enabling space saving of branch portions.

Also, since the connecting plate parts 51 of the connecting terminals 50 are connected to the connecting parts 40 of the trunk lines 21 in a surface contact state, a large contact area and thus high connection reliability can be secured.

Further, since the connecting terminals 50 connected to the trunk lines 21 are conducted to the branch lines 71 through the conductor patterns of the circuit board 60 arranged along the arrangement direction of the trunk lines 21, the connecting terminals 50 can be made common and the shape thereof can be simplified, thereby enabling cost reduction.

And, according to the wire harness 10 of this embodiment including this branch structure, it is possible to provide a wire harness which can achieve space saving and high connection reliability in the connecting portions of the trunk harness 11 with the branch harness 12.

Here, in the first embodiment, the trunk line 21 is recessed from both sides to form the flat-shaped connecting part 40. However, as the connecting part 40, only the bonding side thereof to the bonding surface 52 of the connecting plate part 51 may be recessed to form the connecting surface 42.

Also, the connecting surface 42 of the connecting part 40 is not limited to a flat surface but may also be a convex or concave curved surface. In this case, the bonding surface of the connecting plate part 51 to be connected to the connecting surface 42 constituted of this curved surface may be a convex or concave curved surface which can be surface contacted with the connecting surface 42.

And, the connecting procedure of the respective members of the branch box 100A is not limited particularly. For example, after the connecting terminals 50 are connected to the trunk lines 21, the connecting terminals 50 may be connected to the circuit board 60, or, after the connecting terminals 50 are connected to the circuit board 60, the trunk lines 21 may be connected to the connecting terminals 50.

Here, the trunk harness 11 and branch harness 12 constituting the wire harness 10 can be connected and branched by various kinds of branch structures.

Description is given below of modifications of the branch structure of the first embodiment. Here, the same composing parts as the first embodiment are given the same designations and thus the description thereof is omitted.

(Modification 1-1)

Figure 5:
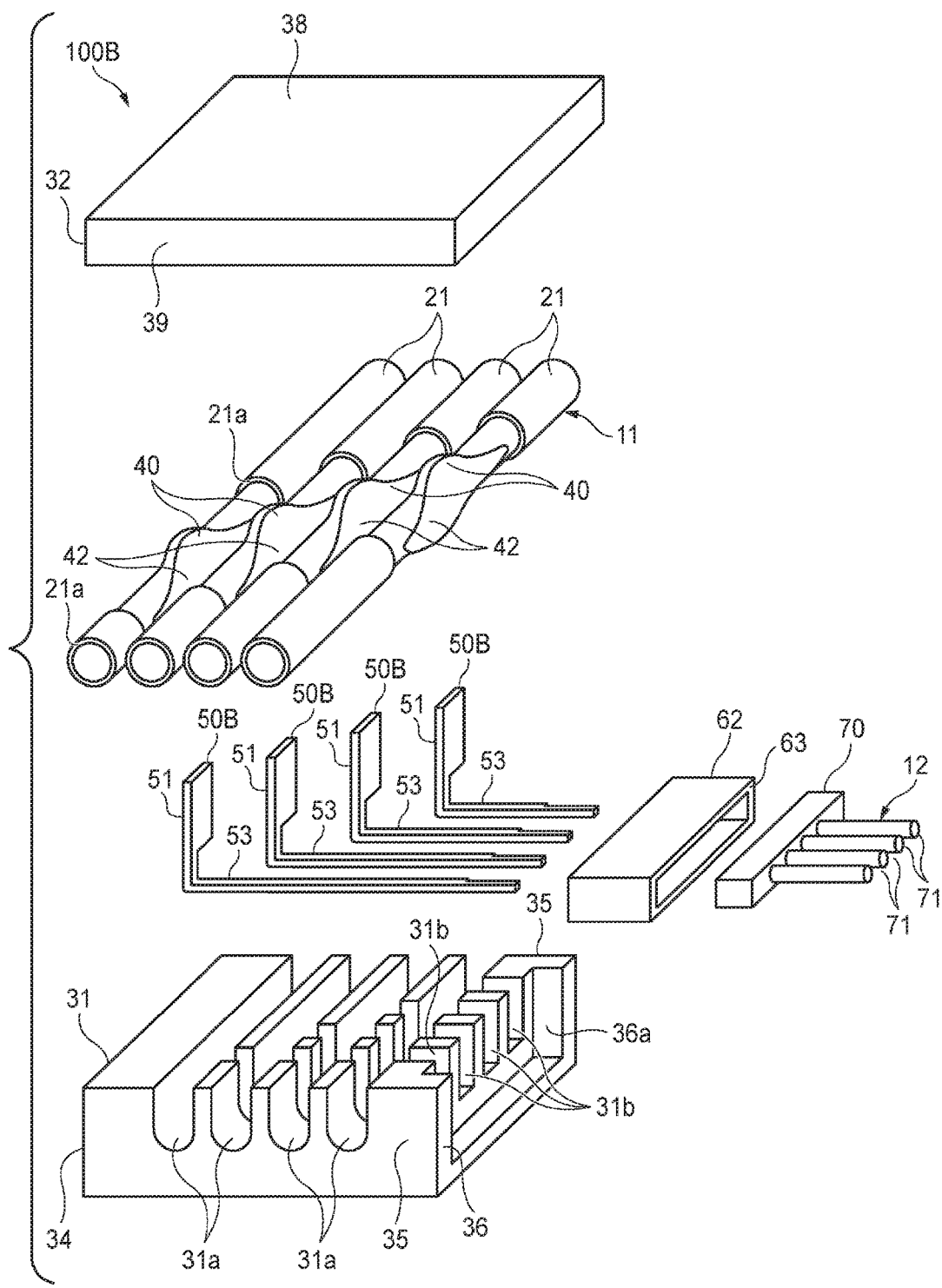
FIG. 5 is an exploded perspective view of a branch box for explanation of a modification 1-1.

FIG. 5 is an exploded perspective view of a branch box used to explain a modification 1-1.

As shown in FIG. 5, in the branch structure of the modification 1-1, the trunk harness 11 and branch harness 12 are connected together using a branch box 100B.

In the modification 1-1, the flat-shaped connecting parts 40 of the plurality of trunk lines 21 constituting the trunk harness 11 are arranged at positions shifted in the longitudinal direction of the trunk harness 11.

The branch box 100B does not include the circuit board 60 but includes connecting terminals 50B each having a bus bar part 53. The bus bar part 53 extends downward from the connecting plate part 51 and further extends toward the arrangement direction of the trunk line 21 perpendicular to the longitudinal direction of the trunk harness 11. To the respective trunk lines 21, there are connected connecting terminals 50B whose bus bar parts 53 are different in length according to distances with the branch harnesses 12 to be connected to the connector 62. And, the ends of the bus bar parts 53 of the respective connecting terminals 50B are stored as connecting pins within the housing 63 of the connector 62.

Also, the lower case 31 of the branch box 100B has trunk line storage grooves 31a and bus bar part storage grooves 31b. In the trunk line storage grooves 31a, the connecting parts 40 of the trunk lines 21 are stored and held, respectively. Also, in the bus bar part storage grooves 31b, the bus bar parts 53 of the connecting terminals 50B to be connected to the connecting parts 40 are stored and held, respectively.

In the modification 1-1, the branch side connector 70 of the branch harness 12 is connected to the connector 62 of the branch box 100B, whereby the branch lines 71 constituting the branch harness 12 are electrically connected through the connecting terminals 50B to the trunk lines 21 of the trunk line harness 11.

In the modification 1-1 as well, while suppressing the arrangement direction protrusion of the connecting terminals 50B used to connect the branch lines 71 to the trunk lines 21, the distance between the trunk lines 21 can be reduced as much as possible, thereby enabling space saving of branch portions; and also, a large contact area can be secured, thereby enabling enhancement in connection reliability.

Particularly, in the modification 1-1, use of the connecting terminals 50B each having the bus bar part 53 can eliminate the circuit board 60, thereby enabling cost reduction due to the reduced number of parts.

(Modification 1-2)

Figure 6:
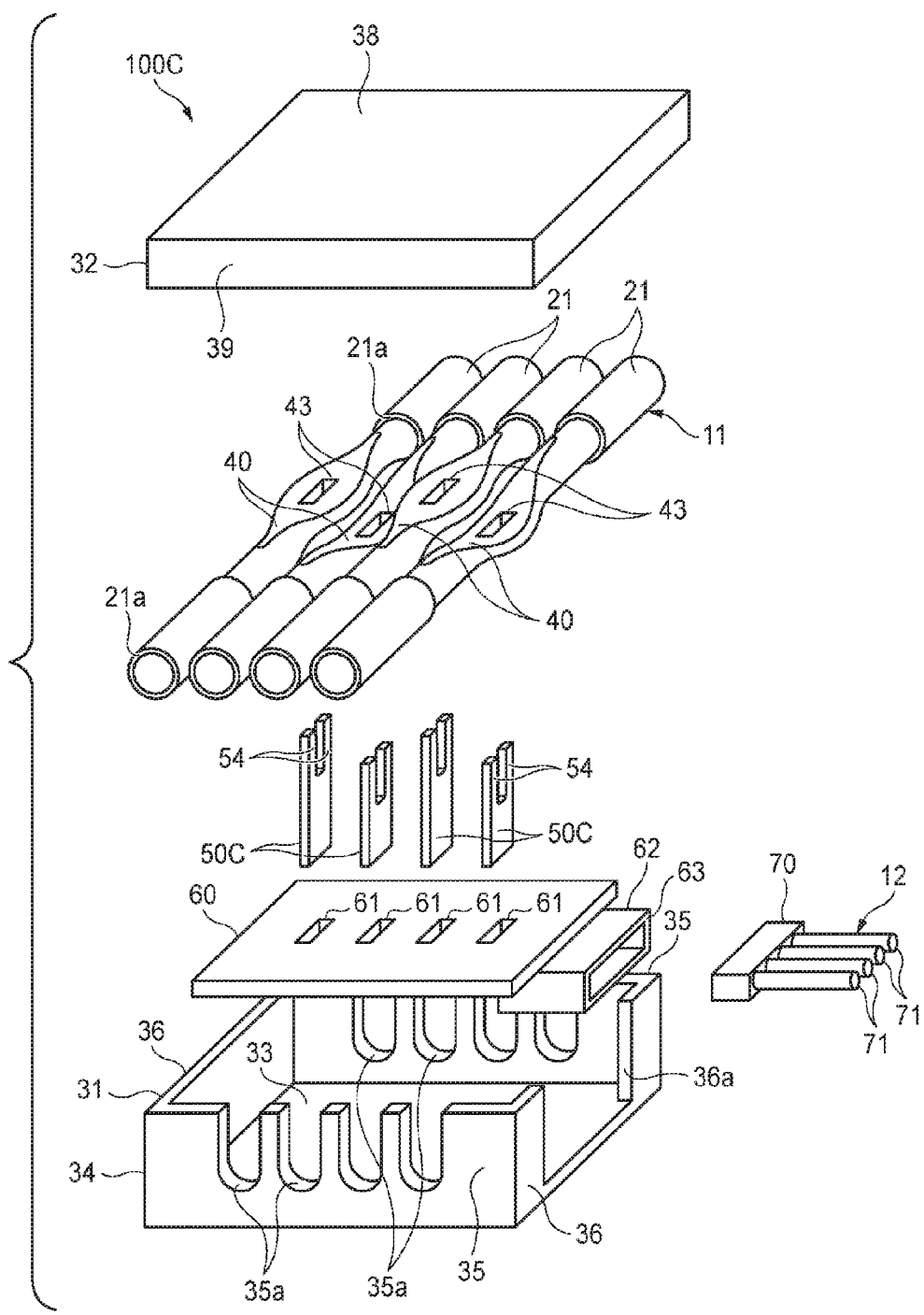
FIG. 6 is an exploded perspective view of a branch box for explanation of a modification 1-2.
Figure 7:
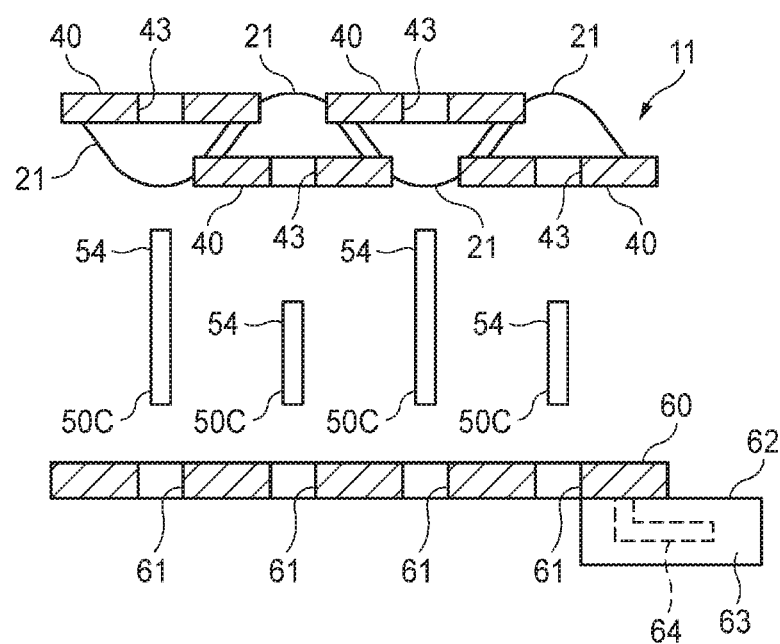
FIG. 7 is a section view of branch portions in the branch box used in the modification 1-2.

FIG. 6 is an exploded perspective view of a branch box for explanation of a modification 1-2. FIG. 7 is a section view of the branch portions of a branch box used in the modification 1-2.

As shown in FIGS. 6 and 7, in a branch structure according to the modification 1-2, the trunk line harness 11 and branch line harness 12 are connected together using a branch box 100C.

In the modification 1-2, the flat-shaped connecting parts 40 of the plurality of trunk lines 21 constituting the trunk line harness 11 are arranged along the horizontal direction. The respective connecting parts 40 are formed at positions shifted in the radial direction; and, in the mutually adjoining trunk lines 21, the connecting parts 40 are arranged at position shifted vertically. Thus, in the mutually adjoining trunk lines 21, the connecting parts 40 are lapped and arranged in the width direction without being in contact with each other. Also, the connecting parts 40 of the respective trunk lines 21 have connecting holes 43 which penetrate the front and back surfaces thereof.

The branch box 100C includes plate-shaped connecting terminals 50C each having a pair of contact pieces 54 in the upper end thereof. The lower ends of the connecting terminals 50C are inserted into insertion holes 61 formed in the circuit board 60 and are soldered to the conductor patterns of the circuit board 60. The connecting terminals 50C are different in length according to heights from the circuit board 60 to the connecting parts 40. Specifically, for the connecting parts 40 having large heights from the circuit board 60, there are used long connecting terminals 50C, whereas, for the connecting parts 40 having small heights from the circuit board 60, there are used short connecting terminals 50C.

Each of the connecting terminals 50C includes a pair of contact pieces 54. When the contact pieces 54 are inserted into connection holes 43 formed in the connecting parts 40 of the trunk lines 21, the contact pieces 54 are pressed inward by the edges of the connection holes 43 and are thereby deformed elastically. Thus, the connecting terminals 50C are engaged into the connection holes 43 by the elastic forces of the contact pieces 54, thereby securing electrical connection with the trunk lines 21.

In the modification 1-2, by connecting the branch side connector 70 of the branch harness 12 to the connector 62 of the branch box 100C, the branch lines 71 constituting the branch harness 12 are electrically connected to the trunk lines 21 of the trunk harness 11 through the conductor patterns of the circuit board 60 and connecting terminals 50C.

According to the modification 1-2, since the connecting terminals 50C to be connected to the trunk lines 21 are arranged at the central positions of the horizontally arranged connecting parts 40, the protrusion of the connecting terminals 50C in the arrangement direction can be eliminated, whereby the distance between the trunk lines 21 can be reduced as much as possible and thus space saving of branch portions can be achieved. Here, the connecting parts 40 of the trunk lines 21 protrude to the left and right; however, since, in the mutually adjoining trunk lines 21, the connecting parts 40 are arranged at positions shifted vertically from each other, the trunk lines 21 and branch lines 71 can be connected together without the connecting parts 40 of the adjoining trunk lines 21 being in contact with each other.

Also, in the modification 1-2, since the paired contact pieces 54 of the connecting terminals 50C are inserted into the connection holes 43 of the connecting parts 40, the trunk lines 21 and connecting terminals 50C can be easily connected together.

(Modification 1-3)

Figure 8:
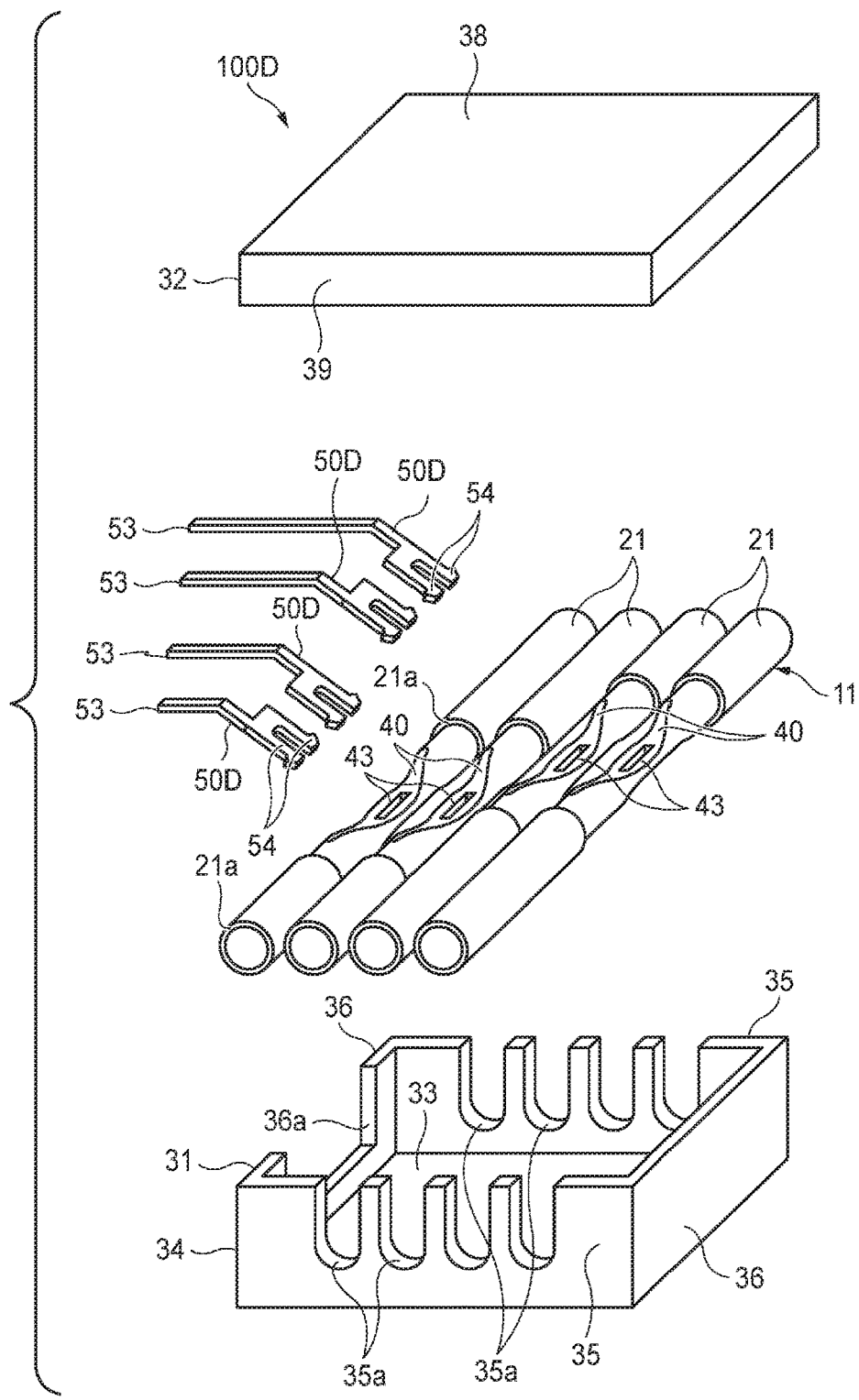
FIG. 8 is an exploded perspective view of a branch box for explanation of a modification 1-3.
Figure 9:
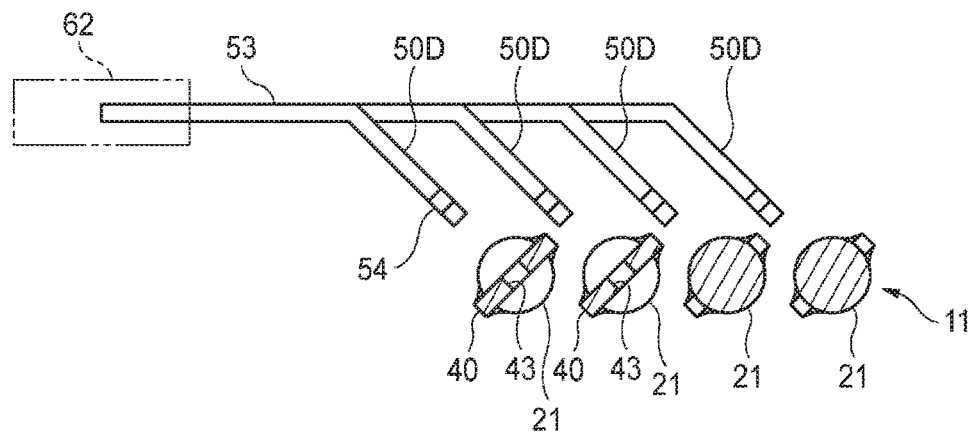
FIG. 9 is a section view of branch portions in the branch box used in the modification 1-3.
Figure 10:
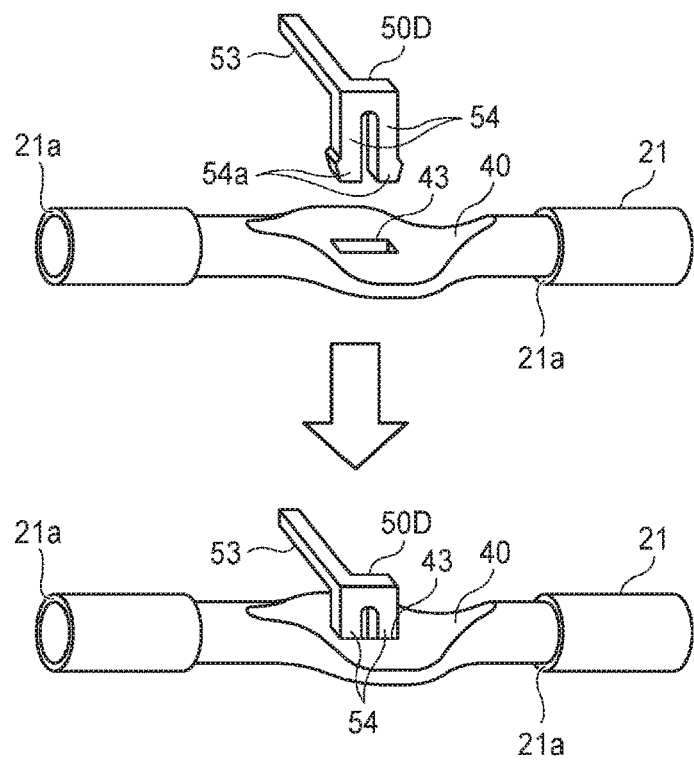
FIG. 10 is a perspective view to show how to connect together a trunk line and a branch line in the modification 1-3.

FIG. 8 is an exploded perspective view of a branch box for explanation of a modification 1-3. FIG. 9 is a section view of branch portions in the branch box used in the modification 1-3. FIG. 10 is a perspective view to show how to connect together a trunk line and a branch line in the modification 1-3.

As shown in FIGS. 8 and 9, in a branch structure according to the modification 1-3, a trunk line harness 11 and a branch line harness 12 are connected together using a branch box 100D.

In the modification 1-3, the flat-shaped connecting parts 40 of the plurality of trunk lines 21 constituting the trunk harness 11 are arranged obliquely such that they are respectively inclined in the same direction. Also, the connecting parts 40, pair by pair, are arranged at positions shifted in the longitudinal direction of the trunk harness 11. Also, the connecting parts 40 of the trunk lines 21 respectively have connection holes 43 formed to penetrate the front and back thereof.

The branch box 100D does not include the circuit board 60 but includes connecting terminals 50D each having a bus bar part 53. Each bus bar part 53 extends from the connecting plate part 51 in the arrangement direction of the trunk line 21 perpendicular to the longitudinal direction of the trunk harness 11. The respective trunk lines 21 use connecting terminals 50D configured such that the lengths of their bus bar parts 53 are different from each other according to their distances from the position of the branch harness 12. And, the ends of the bus bar parts 53 of the respective connecting terminals 50D are stored as connecting pins within the housing 63 of the connector 62.

Each connecting terminal 50D includes, on one end side, a plate-shaped connecting plate part 51 having a pair of contact pieces 54 and, on the other end side of the connecting plate part 51, there is formed the bus bar part 53. Such portions of the bus bar parts 53 as exist adjacent to the connecting portions with the connecting plate parts 51 are bent, whereby the one-end sides of the connecting plate parts 51 respectively having the contact pieces 54 are directed obliquely downward. Also, in the connecting terminals 50D to be connected to the connecting parts 40 arranged at the same position in the longitudinal direction of the trunk harness 11, the connection positions of the bus bar parts 53 with respect to the connecting plate parts 51 are set at positions spaced from each other.

As shown in FIG. 10, the paired contact pieces 54 of each connecting terminal 50D are inserted from obliquely above into the connection holes 43 of the obliquely inclined connecting part 40 of the trunk line 21. When inserted, the contact pieces 54 are pressed inward by the edges of the connection holes 43 into elastic deformation. Thus, the connecting terminal 50D is engaged with the connection holes 43 by the elastic forces of the respective contact pieces 54, thereby securing an electric connection state with the trunk line 21.

Here, the paired contact pieces 54 of each connecting terminal 50D include, in their respective tip ends, projections 54a which project away from each other. Thus, when the contact pieces 54 are inserted into the connection holes 43, the projections 54a lock the edges of the connection holes, thereby preventing the contact pieces 54 inserted into the connection holes 43 from falling out.

Also, the connecting parts 40 of the trunk lines 21, pair by pair, are arranged at positions shifted in the longitudinal direction of the trunk line harness 11, and, in the connecting terminals 50D to be connected to the connecting parts 40 arranged at the same position in the longitudinal direction of the trunk harness 11, the connection positions of the bus bars 53 with respect to the connecting plate parts 51 are distant from each other. Therefore, the bus bar parts 53 of the connecting terminals 50D connected to the connecting parts 40 of the respective trunk lines 21 are aligned at intervals in the longitudinal direction of the trunk line harness 11 without being in contact with each other, while their ends are stored as connecting pins into the housing 63 of the connector 62.

In the modification 1-3, by connecting the branch side connector 70 of the branch line harness 12 to the connector 62 of the branch box 100D, the branch lines 71 constituting the branch harness 12 are electrically connected through the connecting terminals 50D to the trunk lines 21 of the trunk harness 11.

According to the modification 1-3, the connecting terminals 50D to be connected to the trunk lines 21, pair by pair, are shifted in the longitudinal direction of the trunk harness 11 and are obliquely arranged so as to be in parallel to each other. Therefore, while preventing the connecting terminals 50D from being in contact with each other, the distance between the trunk lines 21 can be reduced as much as possible, thereby enabling space saving of branch portions. Here, since the connecting parts 40 of the trunk lines 21 are respectively arranged to incline obliquely, the connecting parts 40 of the adjoining trunk lines 21 are arranged vertically without being in contact with each other.

Further, in the modification 1-3 as well, by inserting the paired contact pieces 54 of the connecting terminals 50D into the connection holes 43 of the connecting parts 40, the trunk lines 21 and connecting terminals 50D can be easily connected together. Since the projections 54a of the contact pieces 54 lock the edges of the connection holes 43, the connection state of the connecting terminals 50D with respect to the connecting parts 40 can be maintained properly.

And, in the modification 1-3, since use of the connecting terminals 50D having the bus bar parts 53 can eliminate the circuit board 60, cost reduction due to the reduced number of parts can be achieved.

(Modification 1-4)

Figure 11:
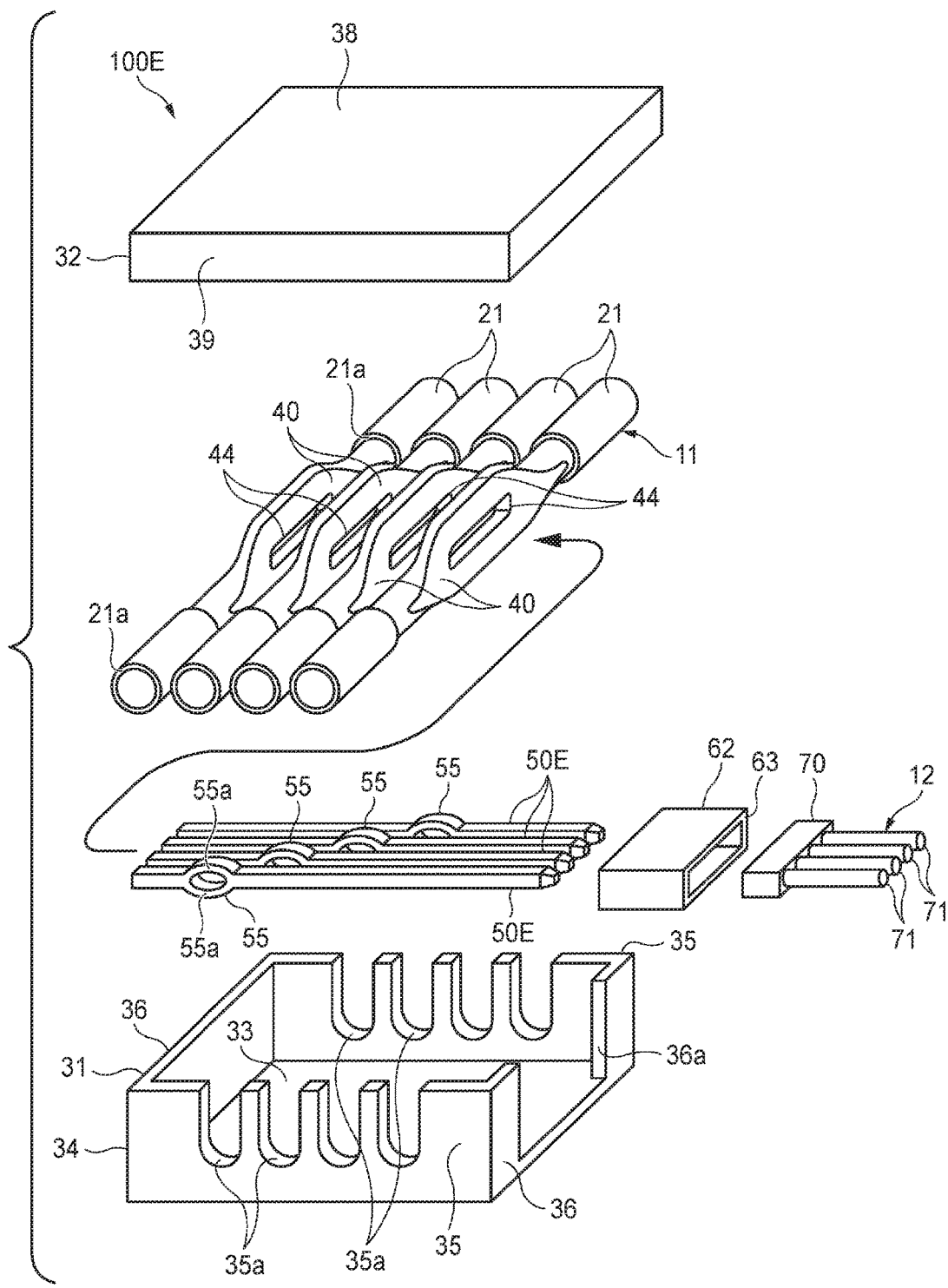
FIG. 11 is an exploded perspective view of a branch box for explanation of a modification 1-4.
Figure 12:
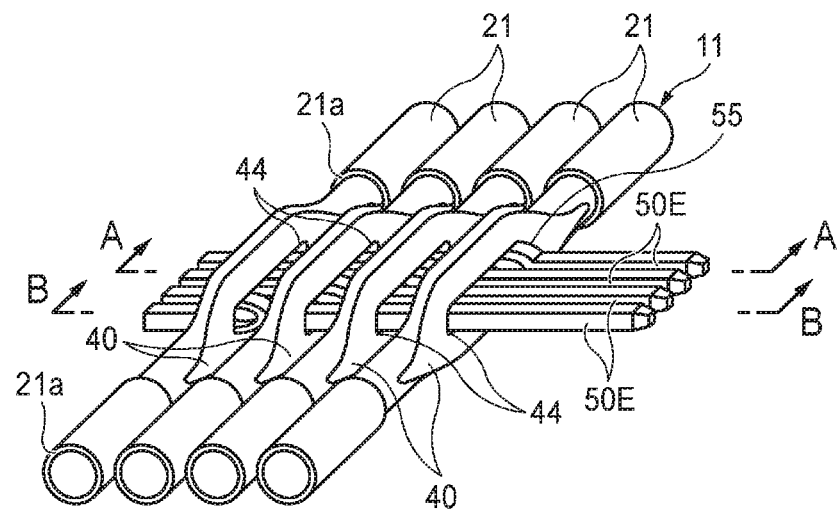
FIG. 12 is a perspective view of branch portions in the branch box used in the modification 1-4.
Figure 13A:
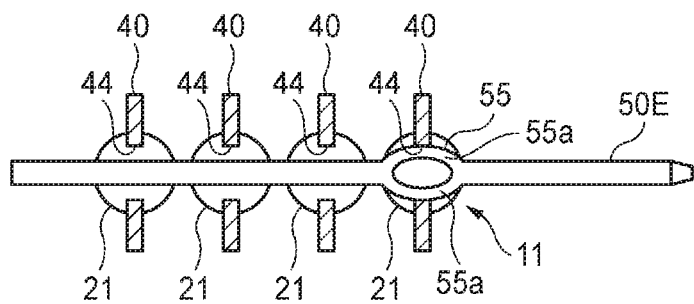
FIG. 13A is a section view taken along the A-A line in FIG. 12.
Figure 13B:
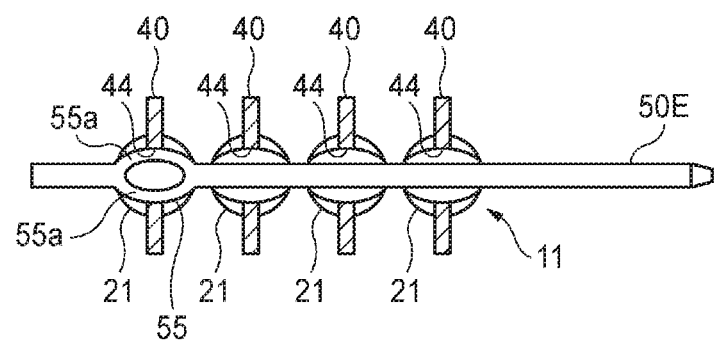
FIG. 13B is a section view taken along the B-B line in FIG. 12.

FIG. 11 is an exploded perspective view of a branch box for explanation of a modification 1-4. FIG. 12 is a perspective view of branch portions in the branch box used in the modification 1-4. FIG. 13 shows the branch portions in the branch box used in the modification 1-4. Specifically, FIG. 13A is a section view taken along the A-A line in FIG. 12, and FIG. 13B is a section view taken along the B-B line in FIG. 12.

As shown in FIG. 11, in the branch structure according to the modification 1-4, the trunk harness 11 and branch harness 12 are connected together using a branch box 100E.

In the modification 1-4, the flat-shaped connecting parts 40 of the plurality of trunk lines 21 constituting the trunk harness 11 are arranged along the vertical direction perpendicular to the arrangement direction of the trunk lines 21. The lengths of the connecting parts 40 along the longitudinal direction of the trunk harness 11 are set long, and the connecting parts 40 respectively have through holes 44 extending along the longitudinal direction of the trunk harness 11. These through holes 44 are in communication with each other in the arrangement direction of the trunk lines 21.

The branch box 100E does not include the circuit board 60 but includes rod-shaped connecting terminals 50E, while the connecting terminals 50E are inserted through the through holes 44 of the connecting parts 40. The connecting terminals 50E respectively have press fit parts 55. Each of the press fit parts 55 includes a pair of contact portions 55a bulged so as to be curved in directions away from each other. The maximum width dimension of each press fit part 55 is set larger than the height dimension of the through hole 44. The connecting terminals 50E are formed at positions where the forming positions of the press fit parts 55 correspond to the arrangement of the trunk lines 21. Also, the ends of the connecting terminals 50E are stored as connecting pins within the housing 63 of the connector 62.

As shown in FIG. 12, the connecting terminals 50E are collectively inserted through the through holes 44 in communication with each other in the arrangement direction of the trunk lines 21. And, as shown in FIGS. 13A and 13B, the press fit parts 55 of the respective connecting terminals 50E are respectively engaged with the through holes 44 of the connecting parts 40 of their corresponding trunk lines 21. When the press fit parts 55 are engaged with the through holes 44 in this manner, the contact portions 55a of the press fit parts 55 are pressed inward by the inner surfaces of the through holes 44 into elastic deformation. Thus, the contact portions 55a are brought into contact with the inner surfaces of the through holes 44 by the elastic forces of the respective contact portions 55a, thereby enabling electric connection between the connecting terminals 50E and trunk lines 21.

In the modification 1-4, by connecting the branch side connector 70 of the branch line harness 12 to the connector 62 of the branch box 100E, the branch lines 71 constituting the branch harness 12 are electrically connected to the trunk lines 21 of the trunk harness 11 through the connecting terminals 50E.

According to the modification 1-4, since the flat-shaped connecting parts 40 of the trunk lines 21 are arranged along the vertical direction perpendicular to the arrangement direction of the trunk lines 21, the distance between the adjoining trunk lines 21 can be reduced as much as possible, thereby enabling space saving of branch portions.

Also, in the modification 1-4, by collectively inserting the plurality of bar-shaped connecting terminals 50E respectively having the press fit parts 55 through the through holes 44 of the connecting parts 40 in communication with each other in the arrangement direction, the press fit parts 55 are contacted with the inner surfaces of the through holes 44 formed in the connecting parts 40 of their corresponding trunk lines 21, thereby enabling easy connection between the trunk lines 21 and connecting terminals 50E.

Also, in the modification 1-4 as well, since use of the bar-shaped connecting terminals 50E can eliminate the circuit board 60, cost reduction due to the reduced number of parts can be achieved.

Second Embodiment

Next, description is given of a second embodiment. Here, the same composing parts as the first embodiment are given the same designations and thus the description thereof is omitted.

Figure 14:
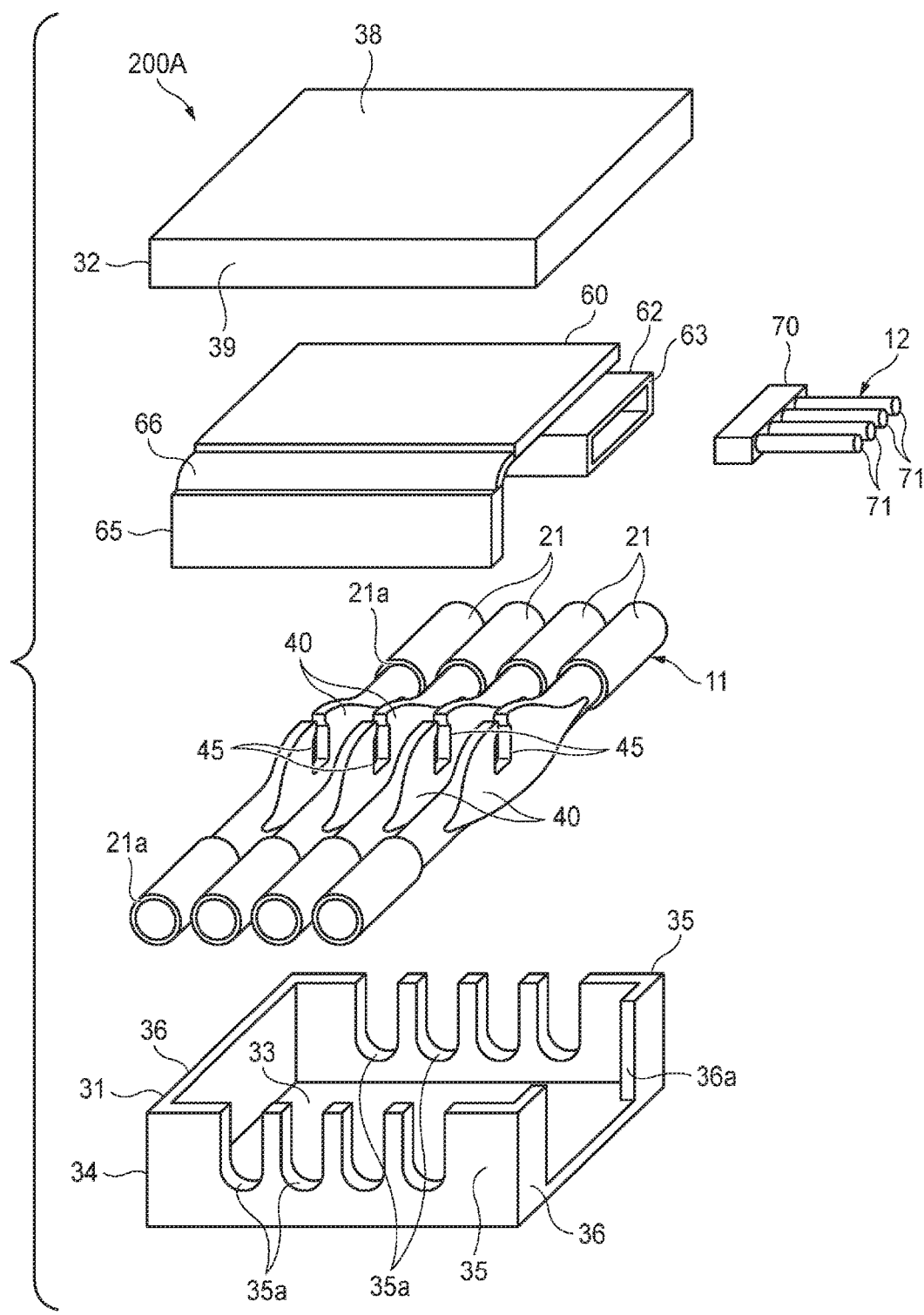
FIG. 14 is an exploded perspective view of a branch box used in a branch structure according to a second embodiment.
Figure 15:
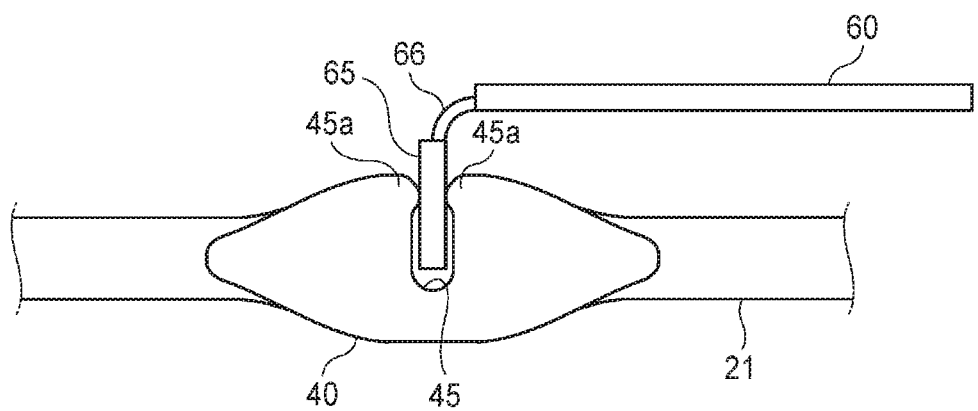
FIG. 15 is a side view of a branch portion in a branch box used in the branch structure of the second embodiment.

FIG. 14 is an exploded perspective view of a branch box used in a branch structure according to a second embodiment. FIG. 15 is a side view of a branch portion in a branch box used in the branch structure of the second embodiment.

As shown in FIG. 14, in the second embodiment, the trunk harness 11 and branch harness 12 are connected together using a branch box 200A excluding the connecting terminals 50. That is, the branch box 200A connects the trunk lines 21 of the trunk harness 11 and circuit board 60 directly.

Within the storage case 30, flat-shaped connecting parts 40 formed in the trunk harness 11 are stored in such a state where they are arranged along the vertical direction perpendicular to the arrangement direction of the trunk lines 21. The connecting parts 40 respectively have, in their respective upper portions, cut-out portions 45 which are arranged in a line along the arrangement direction of the trunk lines 21.

In the branch box 200A, above the trunk lines 21 of the trunk line harness 11, there is arranged a circuit board 60 which includes a connecting substrate part 65 composed of a hard substrate. The connecting substrate part 65 is connected to such one edge of the circuit board 60 as extends along the arrangement direction of the trunk lines 21 by a flexible part 66 composed of a flexible wiring board etc.

As shown in FIG. 15, the connecting substrate part 65, when the flexible part 66 is bent, is directed downward toward the trunk lines 21 and is inserted into the cut-out portions 45 of the connecting parts 40.

In the connecting substrate part 65, conductor patterns formed in the circuit board 60 and connected to the connecting pins 64 are guided through the flexible parts 66 to insertion portions for the respective cut-out portions 45. Also, each cut-out portion 45 includes, on the open-side ends thereof, contact points 45a which project in directions toward each other.

In the above-structured branch box 200A, by inserting the connecting substrate parts 65 into the cut-out portions 45, the contact points 45a of the cut-out portions 45 are brought into contact with the conductor patterns guided to the connecting substrate part 65. Thus, the conductor patterns of the circuit board 60 connected to the respective connecting pins 64 are conducted to the respective trunk lines 21.

In the second embodiment, by contacting the branch side connector 70 of the branch harness 12 to the connector 62 of the branch box 200A, the branch lines 71 constituting the brunch harness 12 are electrically connected to the trunk lines 21 of the trunk harness 11 through the conductor patterns of the circuit board 60 having the connecting substrate part 65.

Thus, according to the branch structure of the second embodiment using the above branch box 200A, by engaging the edge of the connecting substrate part 65 of the circuit board 60 with the cut-out portions 45 of the connecting parts 40, the trunk lines 21 and branch lines 71 can be electrically connected together easily. Also, since the connecting parts 40 of the trunk lines 21 to be engaged with the connecting substrate part 65 of the circuit board 60 are each formed in a flat shape extending along the vertical direction perpendicular to the arrangement direction of the trunk lines 21, the distance between the trunk lines 21 can be reduced as much as possible, thereby enabling space saving of the branch portions.

Also, the present branch structure can eliminate parts such as a bus bar and a terminal for electrically connecting together the trunk lines 21 and branch lines 71 to reduce the number of parts, thereby enabling cost reduction.

And, according to a wire harness 10 according to the second embodiment including this branch structure, it is possible to provide a wire harness which can save the space for the connecting portions of the trunk harness 11 with the branch harness 12 and can reduce the cost thereof.

Here, in the branch box 200A, the connecting substrate part 65 is connected to the circuit board 60 by the flexible part 66. However, the connecting substrate part 65 may be connected directly to the circuit board 60 such that the former faces vertically downward toward the latter.

Now, description is given below of modifications of the branch structure of the second embodiment. Here, the same parts as the first and second embodiments are given the same designations and thus the description thereof is omitted.

(Modification 2-1)

Figure 16:
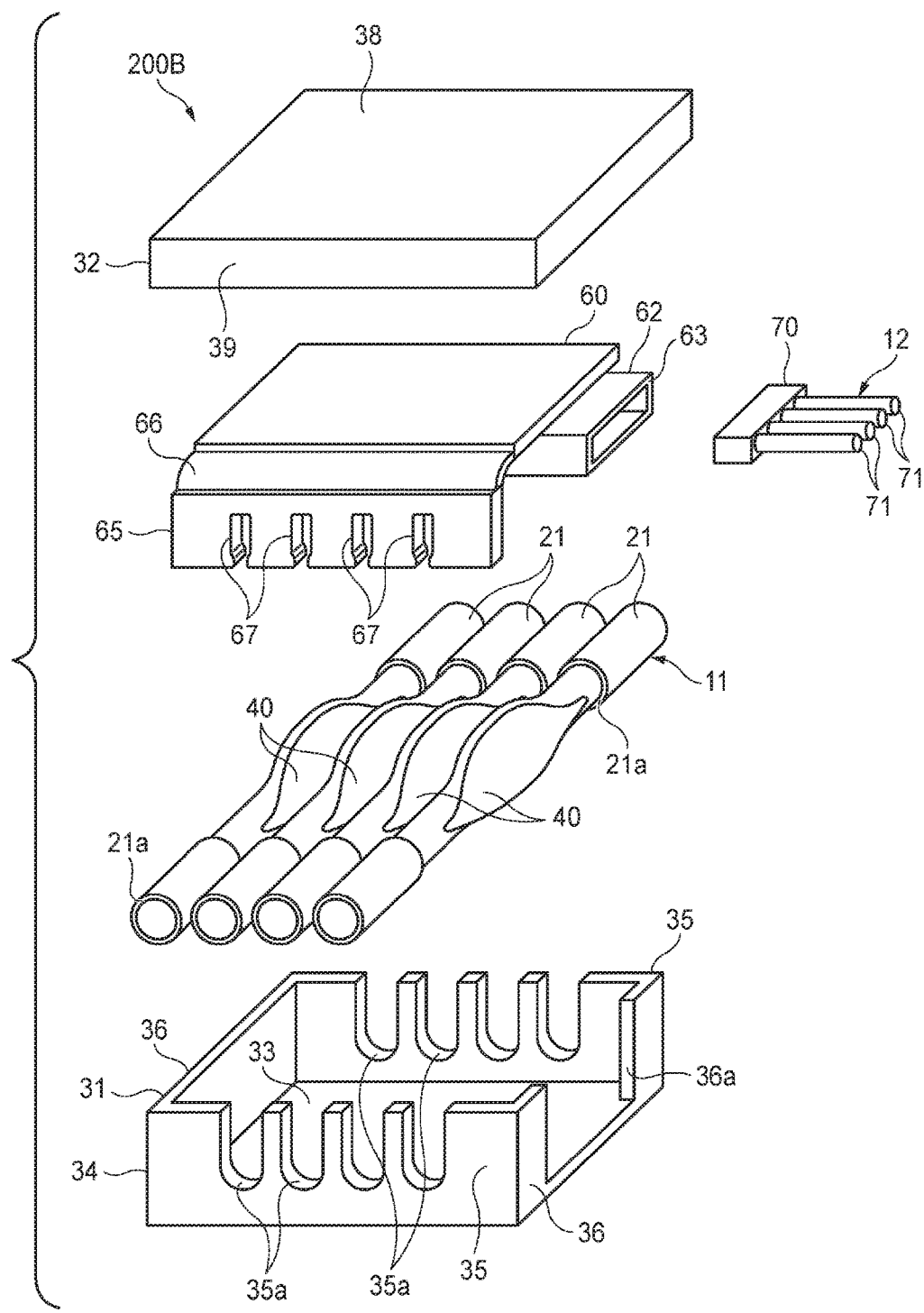
FIG. 16 is an exploded perspective view of a branch box for explanation of a modification 2-1.
Figure 17:
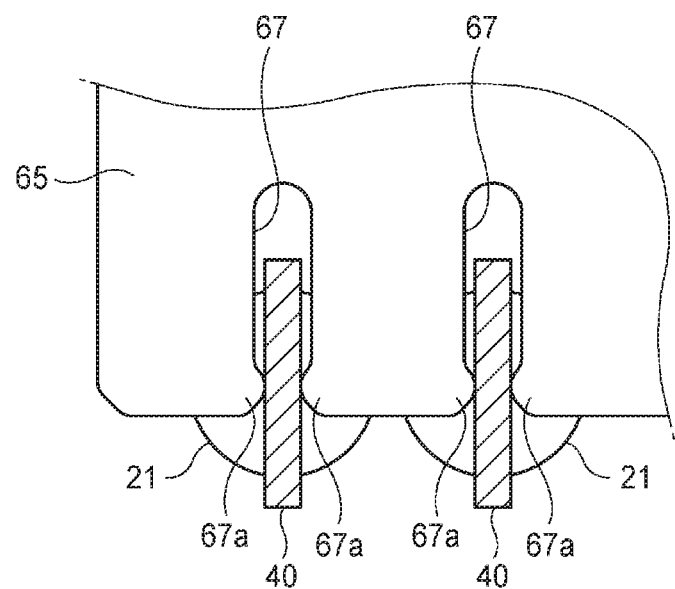
FIG. 17 is a section view of a part of a branch portion in the branch box used in the modification 2-1.

FIG. 16 is an exploded perspective view of a branch box for explanation of a modification 2-1. FIG. 17 is a section view of a part of a branch portion in the branch box used in the modification 2-1.

As shown in FIG. 16, in the branch structure according to the modification 2-1, the trunk harness 11 and branch harness 12 are connected together using a branch box 200B.

In the modification 2-1, the cut-out portions 45 are not formed in the connecting parts 40 but cut-out portions 67 are formed in the connecting substrate parts 65 of the circuit board 60. These cut-out portions 67 are respectively formed at positions corresponding to the trunk lines 21.

As shown in FIG. 17, the cut-out portions 67 of the connecting substrate parts 65 respectively include, in the open side ends, contact points 67a which project in directions toward each other. Conductor patterns formed in the circuit board 60 and connected to the connecting pins 64 are introduced through the flexible parts 66 to the contacts 67a of the respective cut-out portions 67 of the connecting substrate parts 65.

In the above-structured branch box 200B, the connecting substrate parts 65 are directed toward the trunk lines 21 and the connecting parts 40 of the trunk lines 21 are inserted into the respective cut-out portions 67 of the connecting substrate parts 65, thereby bringing the conductor patterns introduced to the contact points 67a of the cut-out portions 67 into contact with the connecting parts 40. Thus, the conductor patterns of the circuit board 60 connected to the connecting pins 64 are conducted to the respective trunk lines 21.

In the modification 2-1, by connecting the branch side connector 70 of the branch harness 12 to the connector 62 of the branch box 200B, the branch lines 71 constituting the branch harness 12 are electrically connected to the trunk lines 21 of the trunk harness 11 through the conductor patterns of the circuit board 60 having the connecting substrate parts 65.

According to the modification 2-1, by engaging the edges of the connecting parts 40 into the cut-out portions 67 formed in the connecting substrate parts 65 of the circuit board 60, the trunk lines 21 and branch lines 71 can be electrically connected together easily. Also, since the connecting parts 40 of the trunk lines 21 to be engaged with the connecting substrate parts 65 of the circuit board 60 are each formed in a flat shape extending along the vertical direction perpendicular to the arrangement direction of the trunk lines 21, the distance between the trunk lines 21 can be reduced as much as possible and thus the space for the branch portions can be saved.

Also, this modification can eliminate parts such as a bus bar and a terminal used to electrically connect together the trunk lines 21 and branch lines 71 to reduce the number of parts, thereby enabling cost reduction.

Here, in the branch box 200B as well, the connecting substrate part 65 is connected to the circuit board 60 by the flexible part 66. However, the connecting substrate part 65 may also be connected directly to the circuit board 60 such that the former is directed vertically downward toward the latter.

(Modification 2-2)

Figure 18:
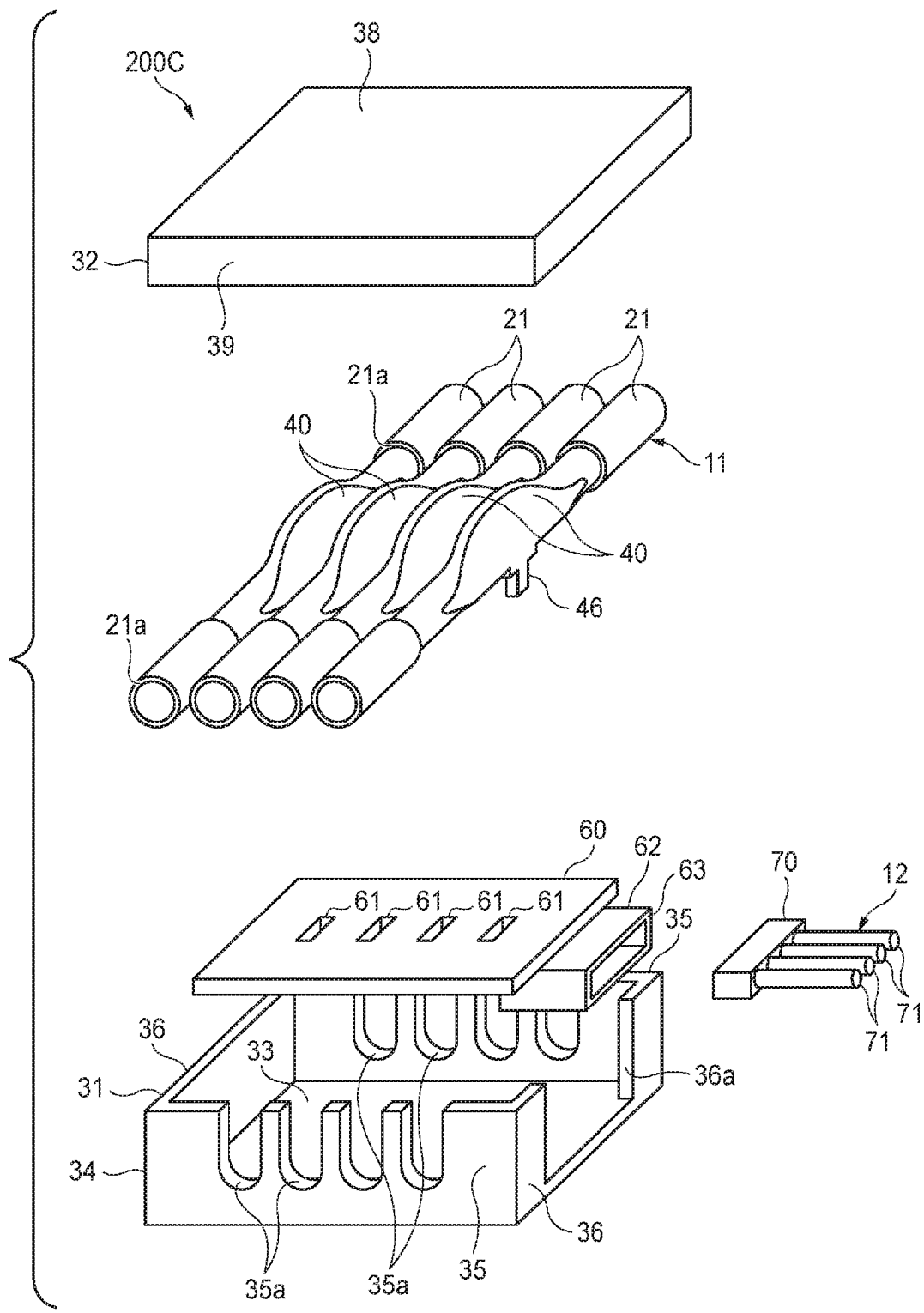
FIG. 18 is an exploded perspective view of a branch box for explanation of a modification 2-2.
Figure 19:
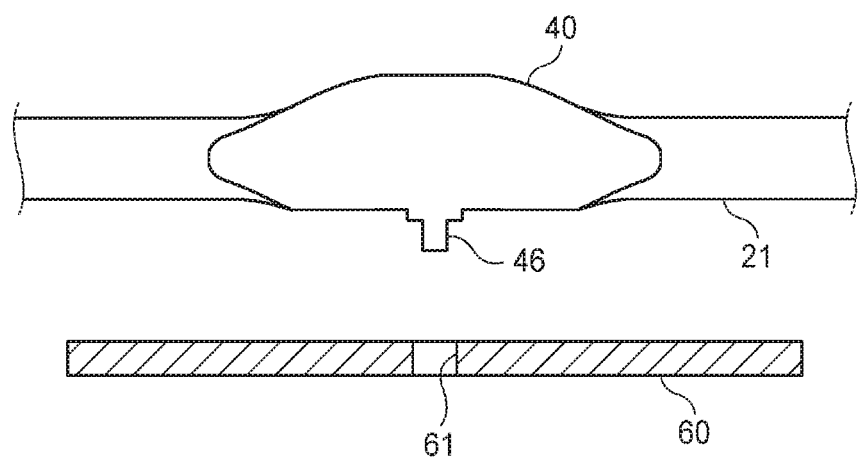
FIG. 19 is a side view of a circuit board, when it is viewed in cross section in a branch portion of the branch box used in the modification 2-2.
Figure 20:
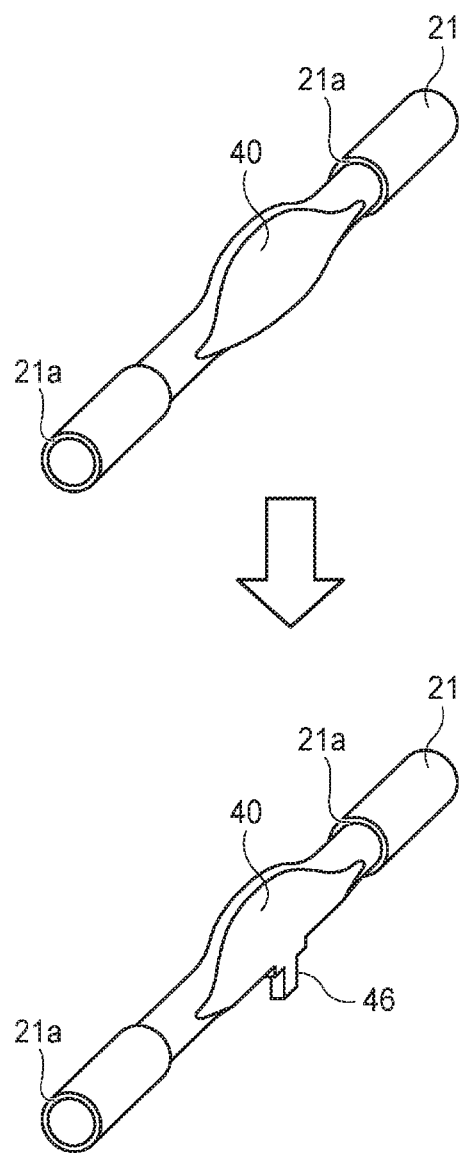
FIG. 20 is a perspective view of a connecting part in the modification 2-2, explaining how a pin portion is formed with respect to the connecting part.
Figure 21:
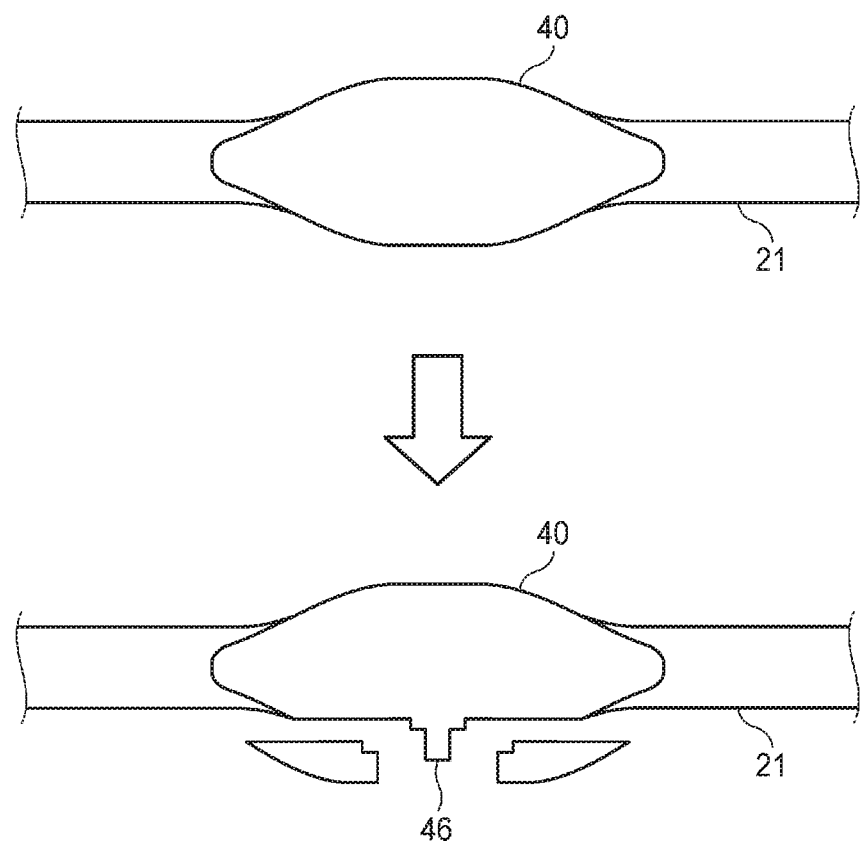
FIG. 21 is a side view of the connecting part in the modification 2-2, explaining how the pin portion is formed with respect to the connecting part.

FIG. 18 is an exploded perspective view of a branch box for explanation of a modification 2-2. FIG. 19 is a side view of a circuit board, when it is viewed in cross section in a branch portion of the branch box used in the modification 2-2. FIG. 20 is a perspective view of a connecting part in the modification 2-2, explaining how a pin portion is formed in the connecting part. FIG. 21 is a side view of the connecting part in the modification 2-2, explaining how the pin portion is formed in the connecting part.

As shown in FIG. 18, in the branch structure of the modification 2-2, the trunk harness 11 and branch harness 12 are connected together using a branch box 200C.

In the modification 2-2, the flat-shaped connecting parts 40 of the plurality of trunk lines 21 constituting the trunk harness 11 are arranged along the vertical direction perpendicular to the arrangement direction of the trunk lines 21, and each connecting part 40 includes a pin portion 46 formed in the lower portion thereof. The pin portion 46 projects toward a circuit board 60 arranged below it.

As shown in FIG. 19, the pin portion 46 formed in the connecting part 40 is inserted into an insertion hole 61 formed in the circuit board 60. And, the pin portion 46 is soldered to a conductor pattern formed in the circuit board 60 and is thus connected electrically thereto. Thus, each trunk line 21 is electrically connected through the conductor pattern of the circuit board 60 to the connecting pin 64 of the connector 62.

As shown in FIGS. 20 and 21, each trunk line 21 is pressed from both sides to thereby form the flat-shaped connecting part 40 and, after then, the downward projecting portion of the connecting part 40 is machined or press worked to remove other portions so that a portion to become the pin portion 46 remains. This makes it easy to form the pin portion 46 which can be inserted into the insertion hole 61 of the circuit board 60.

In the modification 2-2, by connecting the branch side connector 70 of the branch harness 12 to the connector 62 of the branch box 200C, the branch lines 71 constituting the branch harness 12 are electrically connected through the conductor patterns of the circuit board 60 to the trunk lines 21 of the trunk harness 11.

According to the modification 2-2, by inserting the pin portions 46 of the connecting parts 40 of the trunk lines 21 into the insertion holes 61 of the circuit board 60 to connect them to the conductor patterns, the trunk lines 21 and branch lines 71 can be electrically connected together easily. Also, since the connecting parts 40 including the pin portions 41 are each formed in a flat shape extending along the vertical direction perpendicular to the arrangement direction of the trunk lines 21, the distance between the trunk lines 21 can be reduced as much as possible, thereby enabling space saving of the branch portions.

Also, this modification can eliminate parts such as a bus bar or a terminal used to electrically connect the trunk lines 21 and branch lines 71 together to reduce the number of parts, thereby enabling cost reduction.

(Modification 2-3)

Figure 22:
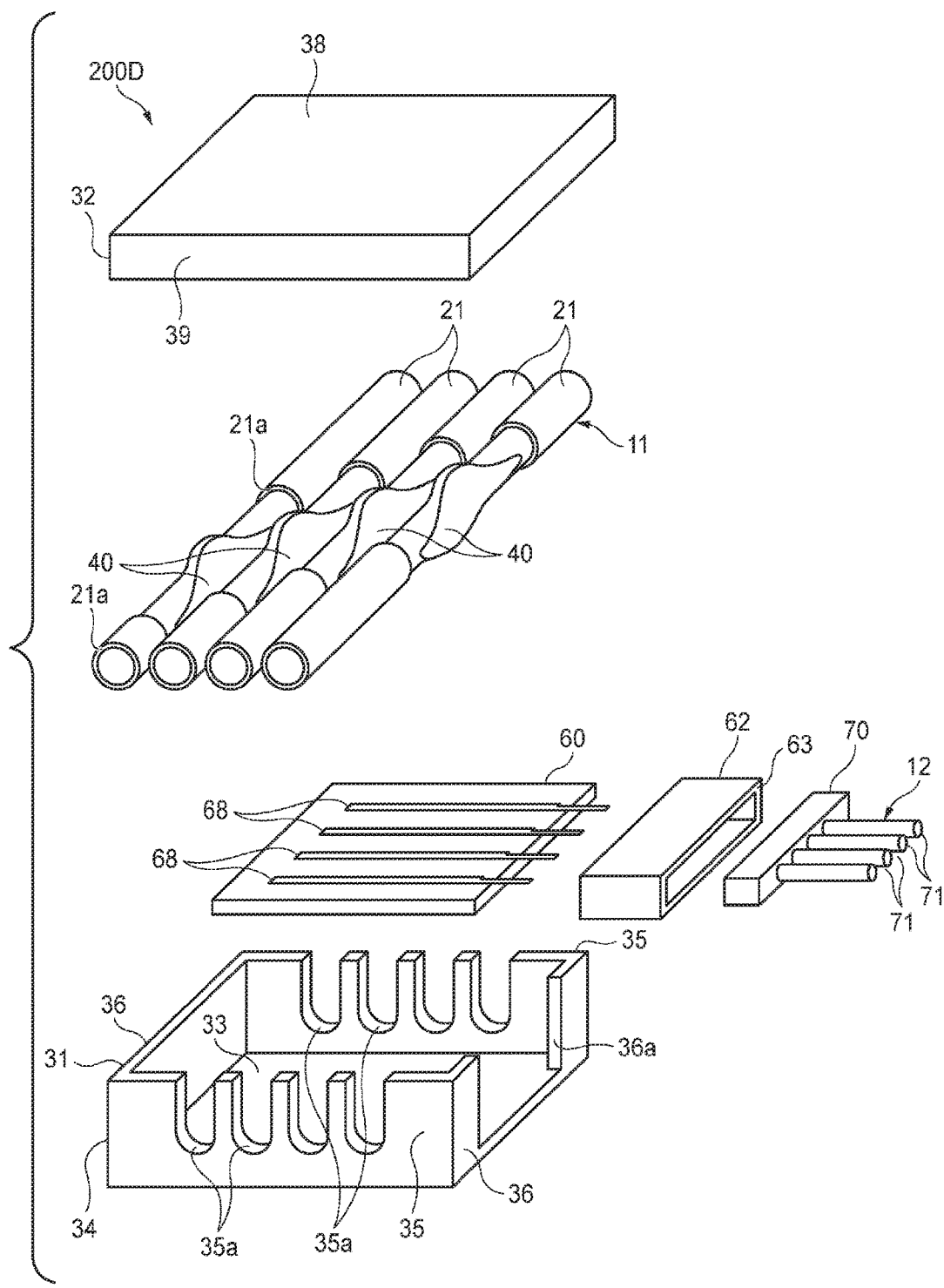
FIG. 22 is an exploded perspective view of a branch box for explanation of a modification 2-3.
Figure 23:
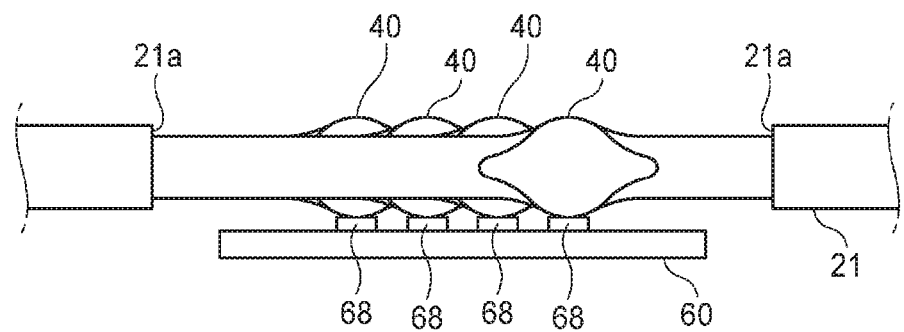
FIG. 23 is a side view of branch portions in the branch box used in the modification 2-3.
Figure 24:
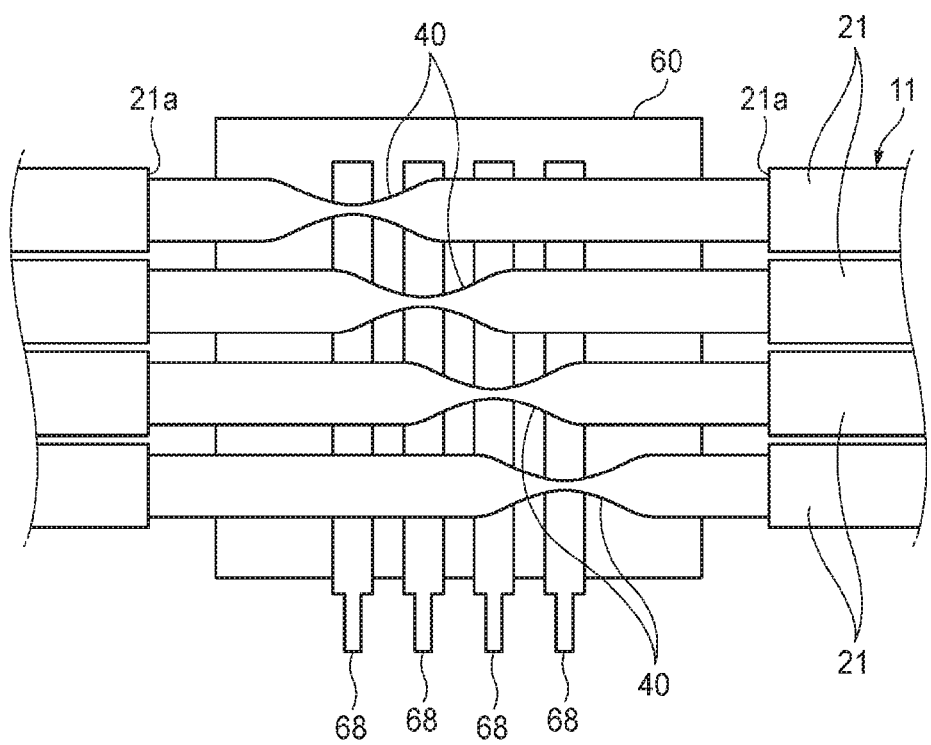
FIG. 24 is a plan view of the branch portions in the branch box used in the modification 2-3.

FIG. 22 is an exploded perspective view of a branch box for explanation of a modification 2-3. FIG. 23 is a side view of branch portions in the branch box used in the modification 2-3. FIG. 24 is a plan view of the branch portions in the branch box used in the modification 2-3.

As shown in FIG. 22, in the branch structure of the modification 2-3, the trunk harness 11 and branch harness 12 are connected together using a branch box 200D.

In the modification 2-3, the flat-shaped connecting parts 40 of the plurality of trunk lines 21 constituting the trunk harness 11 are formed at positions shifted in the longitudinal direction of the trunk harness 11.

In the branch box 200D, the circuit board 60 has belt-shaped conduction surfaces 68.

As shown in FIGS. 23 and 24, the conduction surfaces 68 are respectively shifted in the longitudinal direction of the trunk harness 11 and are arranged at positions corresponding to the connecting parts 40 of their associated trunk lines 21. The conduction surfaces 68 are constituted of conduction patterns formed in the circuit board 60 and are drawn out to one side part of the circuit board 60 respectively. And, the ends of the thus-drawn-out conduction surfaces 68 are stored as connecting pins into the housing 63 of the connector 62. Here, preferably, the thickness of the conduction surfaces 68 may be larger than that of the conductor patterns.

In the branch box 200D, the lower portions of the connecting parts 40 of the trunk lines 21 are contacted with the conduction surfaces 68, and the contact portions between the connecting parts 40 and conduction surfaces 68 are connected together by soldering or ultrasonic bonding. Thus, the lower portions of the respective connecting parts 40 are electrically connected to their corresponding conduction surfaces 68 formed in the circuit board 60. Here, in the branch box 200D, alternatively, while placing the cover 32 over the lower case 31, the connecting parts 40 of the trunk lines 21 may be pressed by the cover 32 to press the lower portions of the connecting parts 40 against their corresponding conduction surfaces 68 formed in the circuit board 60, thereby connecting them together electrically.

In the modification 2-3, by connecting the branch side connector 70 of the branch harness 12 to the connector 62 of the branch box 200D, the branch lines 71 of the branch harness 12 are electrically connected through the conduction surfaces 68 of the circuit board 60 to the trunk lines 21 of the trunk harness 11.

According to the modification 2-3, by bonding together the contact portions of the connecting parts 40 of the trunk lines 21 with the conduction surfaces 68 of the circuit board 60 by soldering or ultrasonic bonding, or by pressing the connecting parts 40 of the trunk lines 21 against the conduction surfaces 68 of the circuit board 60, the trunk lines 21 and branch lines 71 can be easily connected together electrically. Also, since the connecting parts 40 to be conducted to the conduction surfaces 68 are each formed in a flat shape extending along the vertical direction perpendicular to the arrangement direction of the trunk lines 21, the distance between the trunk lines 21 can be reduced as much as possible, thereby enabling space saving of the branch portions.

Also, this modification can eliminate parts such as a bus bar and a terminal used to electrically connect the trunk lines 21 and branch lines 71 together to reduce the number of parts, thereby enabling cost reduction.

Third Embodiment

Next, description is given of a third embodiment. Here, the same composing parts as the first and second embodiments are given the same designations and thus the description thereof is omitted.

Figure 25:
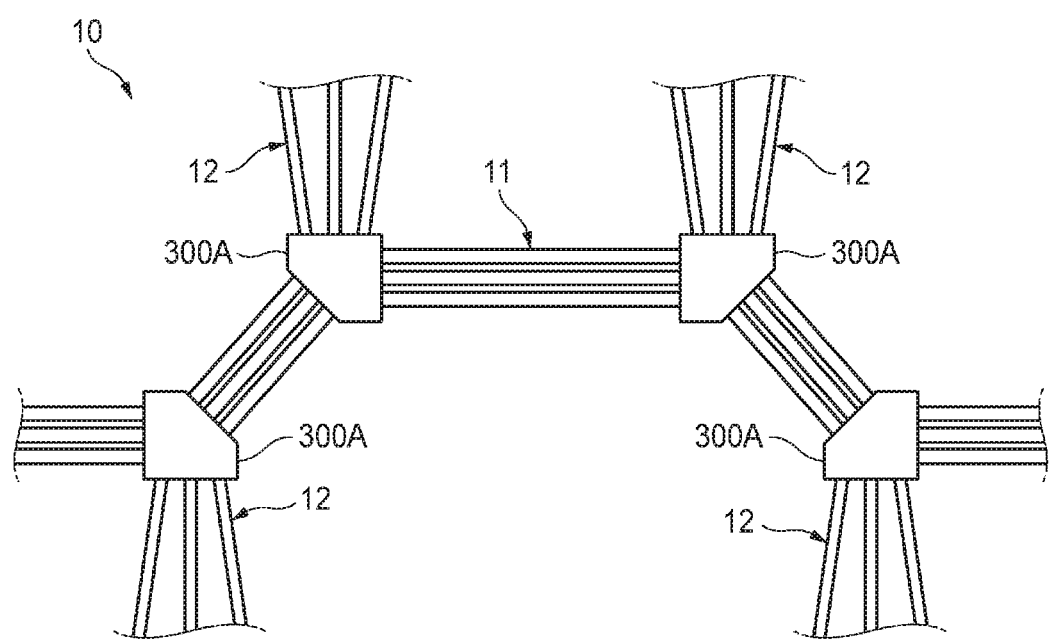
FIG. 25 is a plan view of a wire harness for explanation of the wire harness of the embodiment of the invention using a branch structure according to a third embodiment.

FIG. 25 is a plan view of the wire harness of the embodiment of the invention using a branch structure according to a third embodiment.

In a wire harness 10 for a vehicle, in some cases, it is necessary to bend the arrangement route of the trunk harness 11 according to the shape of a vehicle body 1 etc. In such vehicle harness 10, as shown in FIG. 25, in the connecting portions between the trunk harness 11 and branch harness 12, it is required to bend the arrangement route of the trunk harness 11.

Now, as a branch structure according to the third embodiment, description is given below of a branch structure suitable for use in the branch portions of the branch harness 12 of the wire harness 10 configured such that the arrangement route of the trunk harness 11 is bent.

Figure 26:
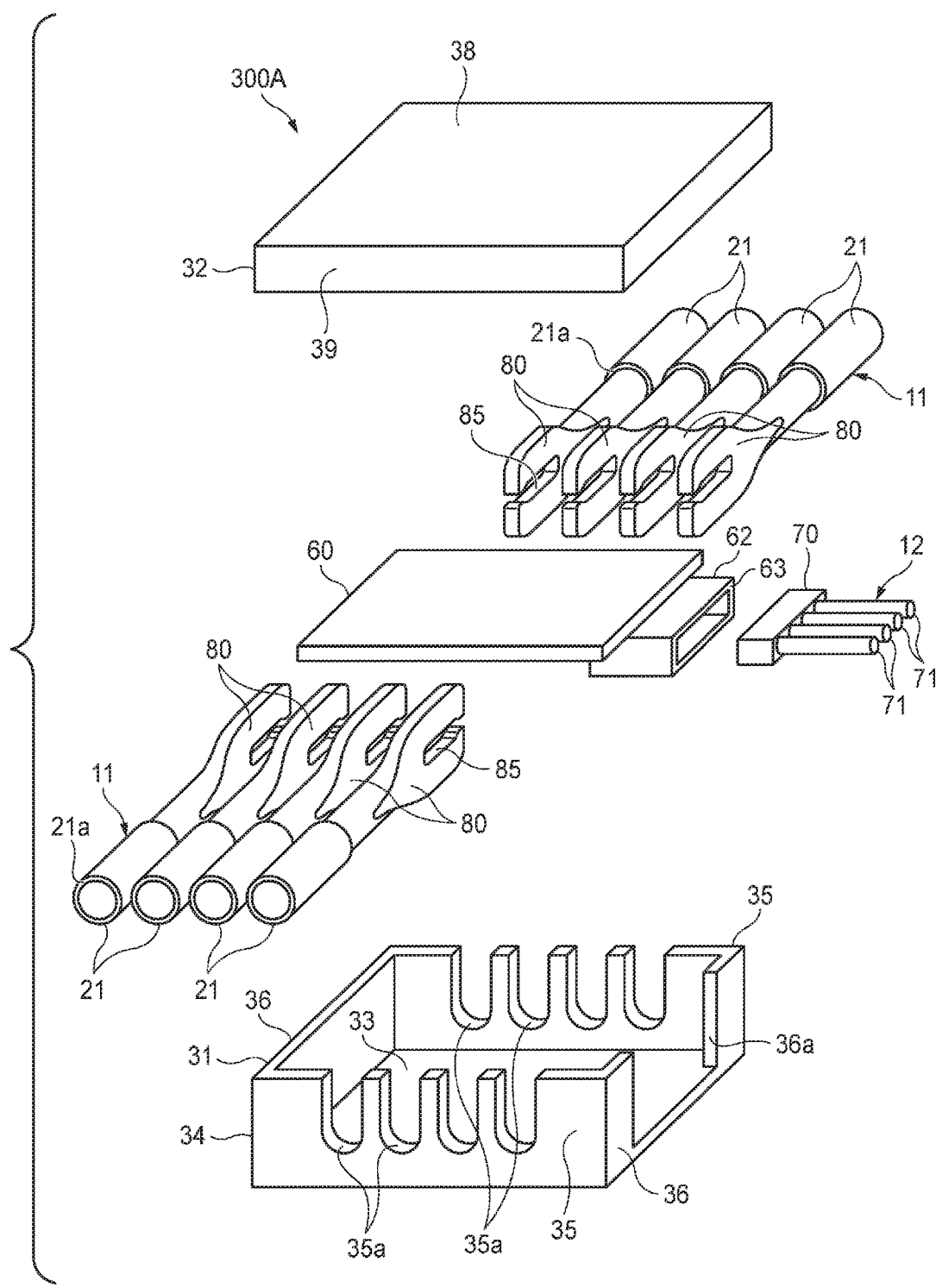
FIG. 26 is an exploded perspective view of a branch box used in the branch structure of the third embodiment.
Figure 27:
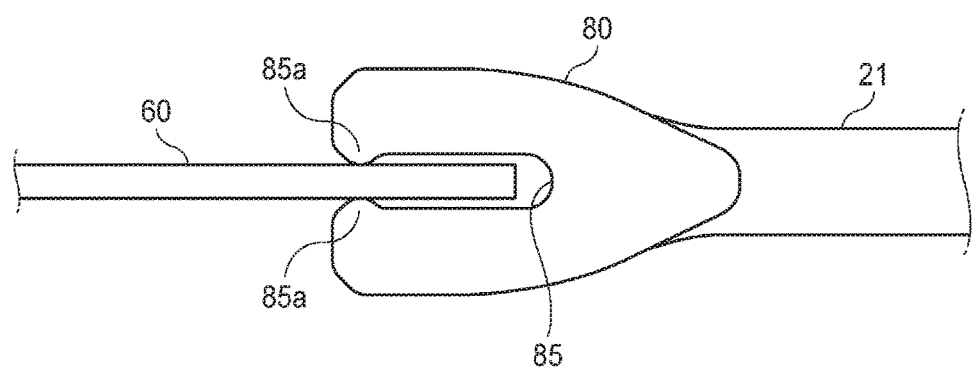
FIG. 27 is a side view of a circuit board in the branch portion of the branch box used in the branch structure of the third embodiment, when viewed in cross section.

FIG. 26 is an exploded perspective view of a branch box used in the branch structure of the third embodiment. FIG. 27 is a side view of a circuit board in the branch portion of the branch box used in the branch structure of the third embodiment, when viewed in cross section.

As shown in FIG. 26, in the third embodiment, the trunk line harness 11 and branch harness 12 are connected together using a branch box 300A. Also, in the third embodiment, the trunk lines 21 of the trunk harness 11 are divided respectively and the divided trunk lines 21 each include a connecting part 80 in the end thereof. By pressing the end of each trunk line 21 from both sides into plastic deformation, the connecting part 80 is formed in a flat shape.

The ends of the trunk lines 21 are stored within a storage case 30 in a state where the connecting parts 80 are arranged along the vertical direction perpendicular to the arrangement direction of the trunk lines 21. These connecting parts 80 have, in the ends thereof, cut-out portions 85 extending along the axial direction.

As shown in FIG. 27, each cut-out portion 85 includes, in the open side end thereof, two contact points 85a projecting in directions toward each other. Into the cut-out portions 85 of the connecting parts 80 of the trunk lines 21, there is engaged the edge of the circuit board 60. Thus, by engaging the circuit board 60 into the cut-out portions 85 of the connecting parts 80, the contact points 85a of the cut-out portions 85 are contacted with the conductor patterns of the circuit board 60, thereby connecting together the trunk lines 21 and the conductor patterns of the circuit board 60. This brings the conductor patterns of the circuit board 60 connected to their associated connecting pins 64 into conduction to the respective trunk lines 21. Also, the circuit board 60 includes conductor patterns which connect together the connecting portions between the connecting parts 80 of the mutually opposed trunk lines 21, whereby the trunk lines 21 connected at the opposed positions of the circuit board 60 are conducted to each other.

In the third embodiment, by connecting the branch side connector 70 of the branch harness 12 to the connector 62 of the branch box 300A, branch lines 71 constituting the branch harness 12 are electrically connected through the conductor patterns of the circuit board 60 to the divided trunk lines 21 of the trunk harness 11 connected to the circuit board 60. Also, in the third embodiment, by connecting the divided trunk lines 21 to the circuit board 60, these divided trunk lines 21 are electrically connected together.

As described above, in the branch structure of the third embodiment using the branch box 300A as well, by engaging the edge of the circuit board 60 into the cut-out portions 85 of the connecting parts 80, the trunk lines 21 and branch lines 71 can be electrically connected together easily. Also, since the connecting parts 80 of the trunk lines 21 to be engaged with the circuit board 60 are each formed in a flat shape extending along the vertical direction perpendicular to the arrangement direction of the trunk lines 21, the distance between the trunk lines 21 can be reduced as much as possible, thereby enabling space saving of the branch portions.

Also, the third embodiment can eliminate parts such as a bus bar and a terminal used to electrically connect together the trunk lines 21 and branch lines 71 to reduce the number of parts, thereby enabling cost reduction.

And, according to the wire harness 10 of the embodiment of the invention including this branch structure, it is possible to provide a wire harness which can save the space of the connecting portions of the trunk harness 11 to the branch harness 12 and can realize cost reduction.

Particularly, according to the branch structure of the third embodiment using the above branch box 300A, since the divided trunk lines 21 are electrically connected together by the conductor patterns of the circuit board 60, by adjusting the connecting direction of the trunk lines 21 with respect to the circuit board 60, angles can be given to the connecting portions of the divided trunk lines 21. This makes it possible to bend the arrangement route of the trunk harness 11, thereby enabling enhancement in the freedom of route arrangement. Thus, this branch structure is suitable for use in the wire harness 10 (see FIG. 25) configured such that the arrangement direction of the trunk harness 11 is bent in the connecting portions between the trunk harness 11 and branch harness 12. Also, this branch structure can arrange the trunk harness 11 while absorbing variations in the length of the arrangement route thereof in the engagement portions between the cut-out portions 85 of the connecting parts 80 and the edge of the circuit board 60, thereby enabling enhancement in arranging workability.

Description is given below of modifications of the third embodiment. Here, the same composing parts as the first, second and third embodiments are given the same designations and thus the description thereof is omitted.

(Modification 3-1)

Figure 28:
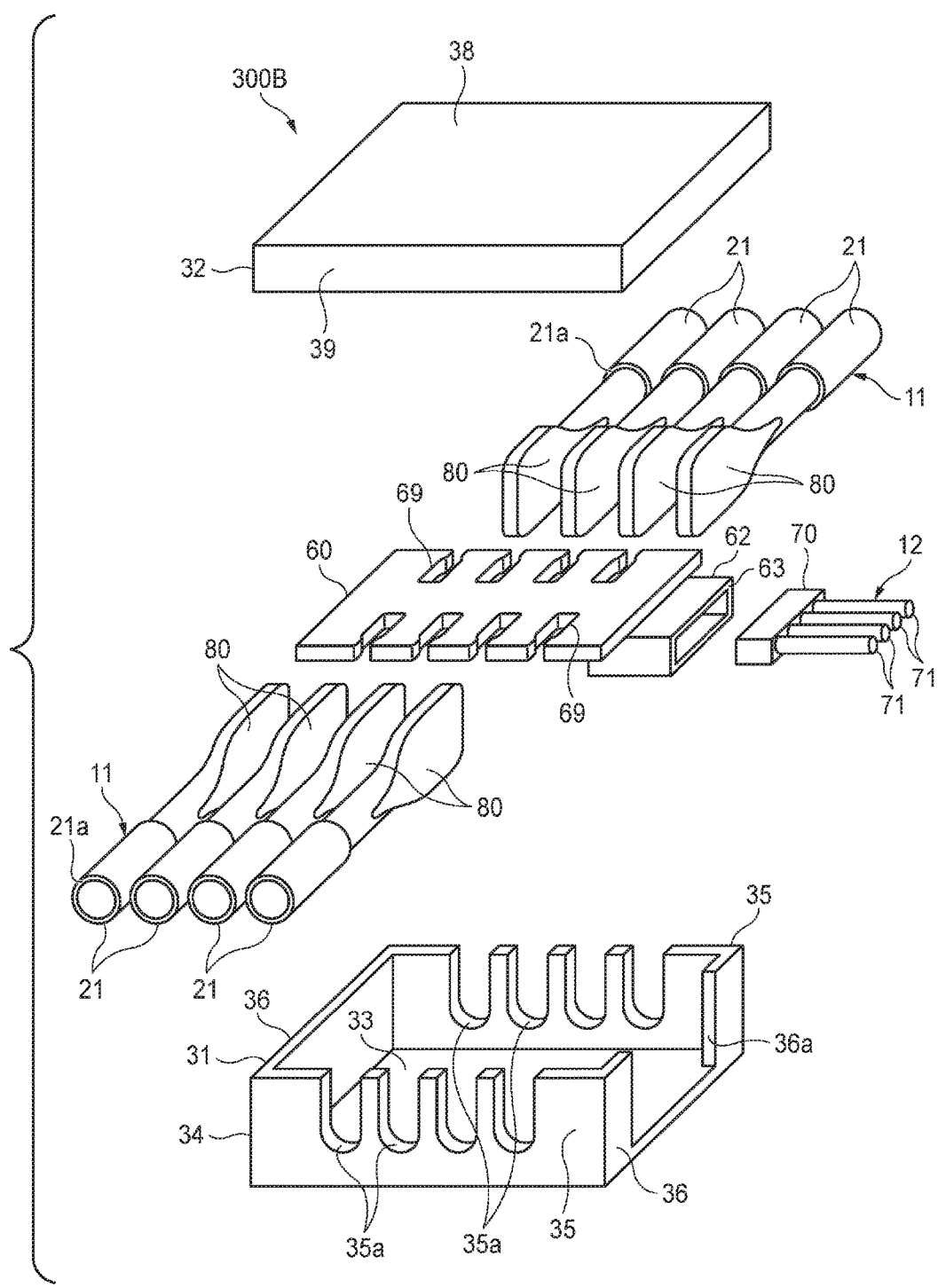
FIG. 28 is an exploded perspective view of a branch box for explanation of a modification 3-1.
Figure 29:
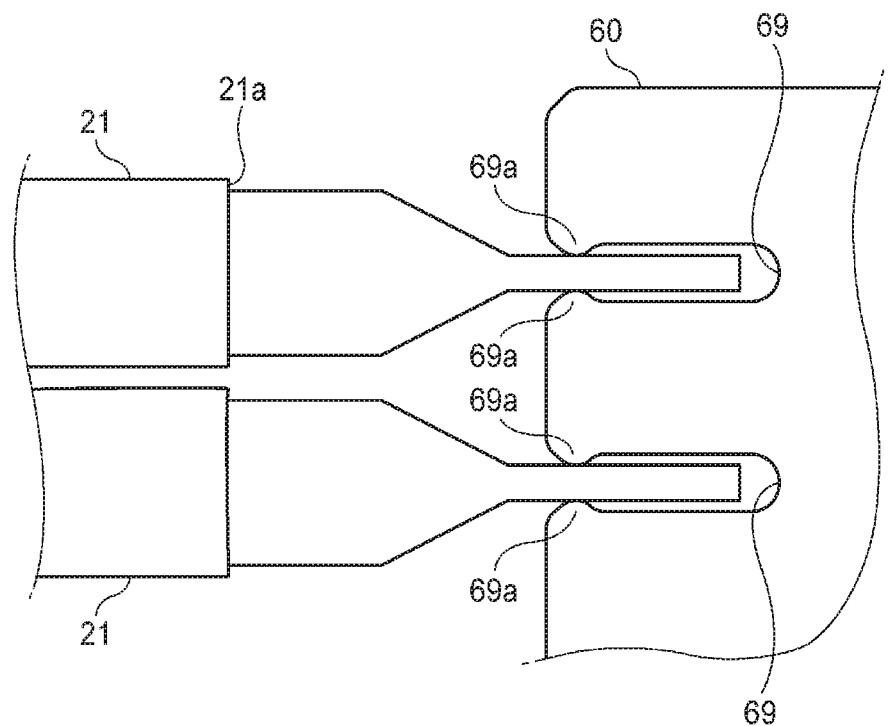
FIG. 29 is a partial plan view of a branch portion in the branch box used in the modification 3-1.

FIG. 28 is an exploded perspective view of a branch box for explanation of a modification 3-1. FIG. 29 is a partial plan view of a branch portion in the branch box used in the modification 3-1.

As shown in FIG. 28, in a branch structure according to the modification 3-1, the trunk harness 11 and branch harness 12 are connected together using a branch box 300B.

In the modification 3-1, the cut-out portions 85 are not formed in the connecting parts 80 of the trunk lines 21 but cut-out portions 69 are formed in the circuit board 60. The cut-out portions 69 are respectively formed at positions for connecting the connecting parts 80 of the trunk lines 21.

As shown in FIG. 29, the cut-out portions 69 of the circuit board 60 each includes, in the open side ends thereof, two contact points 69a projecting in directions toward each other. To the contact points 69a, there are guided conductor patterns connected to the connecting pins 64.

In the above-structured branch box 300B, by inserting the connecting parts 80 of the divided trunk lines 21 into the cut-out portions 69 of the circuit board 60, the contact points 69a of the cut-out portions 69 are brought into contact with the connecting parts 80, whereby the conductor patterns guided to such contact points 69a are conducted to the connecting parts 80. Thus, the conductor patterns of the circuit board 60 connected to their associated connecting pins 64 are conducted to the respective trunk lines 21. Also, the mutually opposed trunk lines 21 are also conducted to each other by the conductor patterns of the circuit board 60.

In the modification 3-1, by connecting the branch side connector 70 of the branch harness 12 to the connector 62 of the branch box 300B, branch lines 71 constituting the branch harness 12 are electrically connected through the conductor patterns of the circuit board 60 to the divided trunk lines 21 of the trunk harness 11 connected to the circuit board 60.

In the modification 3-1, by engaging the edges of the connecting parts 80 into the cut-out portions 69 of the circuit board 60, the trunk lines 21 and branch lines 71 can be electrically connected together easily. Also, since the connecting parts 80 of the trunk lines 21 to be engaged with the circuit board 60 are each formed in a flat shape extending along the vertical direction perpendicular to the arrangement direction of the trunk lines 21, the distance between the trunk lines 21 can be reduced as much as possible, thereby enabling space saving of the branch portions.

Also, this modification can eliminate parts such as a bus bar and a terminal used to electrically connect to reduce the number of parts, thereby enabling cost reduction.

And, in the modification 3-1 as well, since the divided trunk lines 21 are electrically connected together by the conduction patterns of the circuit board 60, by adjusting the connecting direction of the trunk lines 21 with respect to the circuit board 60, an angle can be given to the connecting portions of the divided trunk lines 21. This makes it possible to bend the arrangement route of the trunk harness 11 as the need arises, thereby enabling enhancement in the freedom of arrangement. Thus, this modification is suitable for use in the wire harness 10 (see FIG. 25) configured such that the arrangement direction of the trunk harness 11 is bent in the connecting portions between the trunk harness 11 and branch harness 12. Also, in the engaging portions between the cut-out portions 69 of the circuit board 60 and the edges of the connecting parts 80, the trunk lines can be arranged while absorbing variations in the length of the arrangement route of the trunk harness 11, thereby enabling enhancement in the arranging workability.

Next, description is given of various connecting examples for connecting the branch lines 71 of the branch harness 12 to the trunk lines 21 of the trunk harness 11. Here, the same composing parts as the first to third embodiments are given the same designations and thus the description thereof is omitted.

Connecting Example 1

Figure 30:
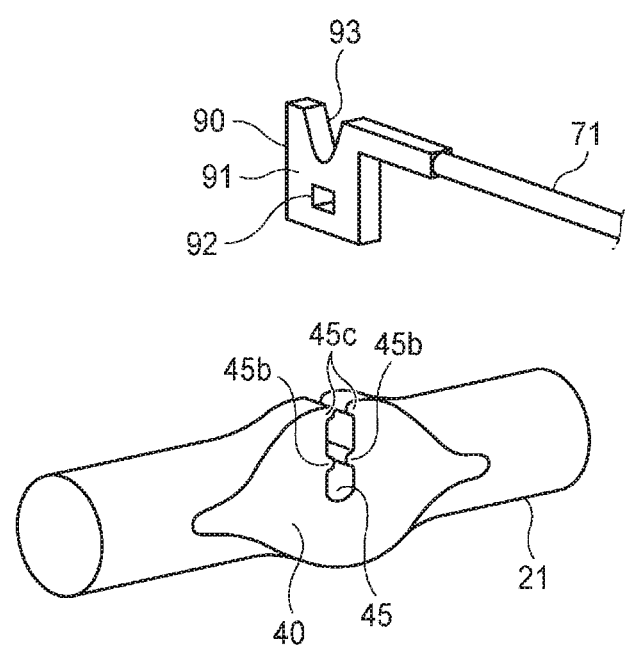
FIG. 30 is a perspective view of a connecting portion between a trunk line and a branch line according to a connecting example 1.

FIG. 30 is a perspective view of a connecting portion between a trunk line and a branch line according to a connecting example 1.

As shown in FIG. 30, in the connecting example 1, a cut-out portion 45 is formed in the flat-shaped connecting part 40 of the trunk line 21. The cut-out portion 45 includes, in the center and open ends in the depth direction, locking projections 45b and 45c which project in directions toward each other.

Also, in the connecting example 1, a connecting terminal is connected to the branch line 71. This connecting terminal 90 includes a plate-shaped connecting plate part 91 in which a hole 92 is formed. The connecting terminal 90 also has a cut portion 93 formed above the hole 92.

In the connecting example 1, the connecting plate part 91 of the connecting terminal 90 connected to the branch line 71 is inserted into the cut-out portion 45 of the connecting part 40 of the trunk line 21. Accordingly, the locking projections 45b of the cut-out portion 45 are inserted into the hole 92 of the connecting plate part 91 to thereby lock it, and the locking projection 45c of the cut-out portion 45 locks the cut portion 93 of the connecting plate part 91, whereby the trunk lines 21 of the trunk harness 11 and the branch lines 71 of the branch harness 12 are electrically connected together.

Connecting Example 2

Figure 31:
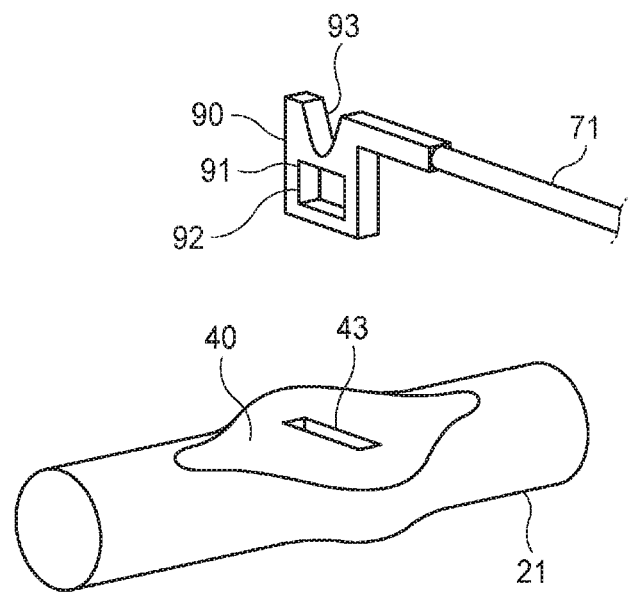
FIG. 31 is a perspective view of a connecting portion between a trunk line and a branch line according to a connecting example 2.

FIG. 31 is a perspective view of a connecting portion between a trunk line and a branch line according to a connecting example 2.

As shown in FIG. 31, in the connecting example 2, a connecting hole 43 is formed in the connecting part 40 of the trunk line 21. Also, in the connecting example 2 as well, a connecting terminal 90 is connected to the branch line 71.

In the connecting example 2, the connecting plate part 91 of the connecting terminal 90 connected to the branch line 71 is pressed into the connecting hole 43 of the connecting part 40 of the trunk line 21. Accordingly, the connecting part 40 and connecting terminal 90 are connected together, whereby the trunk lines 21 of the trunk harness 11 and the branch lines 71 of the branch harness 12 are electrically connected together. Here, in the connecting terminal 90, a hole 92 to be formed in the connecting plate part 91 thereof is set large in size, whereby, when pressing the connecting plate part 91 into the connecting hole 43, the connecting plate part 91 is flexed. This makes it possible to press the connecting plate part 91 into the connecting hole 43 smoothly and positively.

Connecting Example 3

Figure 32:
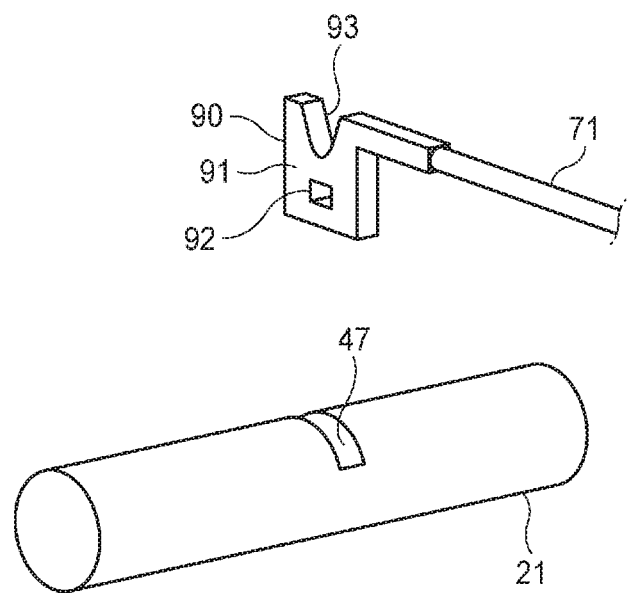
FIG. 32 is a perspective view of a connecting portion between a trunk line and a branch line according to a connecting example 3.
Figure 33:
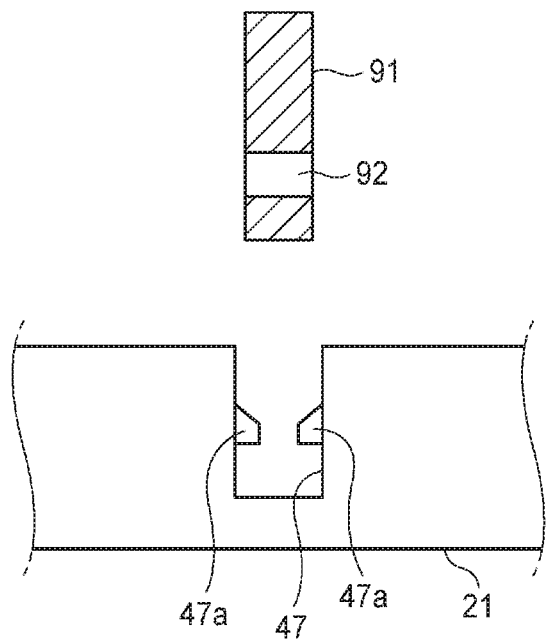
FIG. 33 is a side view of the connecting example 3 when the connecting portion between the trunk and branch lines is viewed in cross section.

FIG. 32 is a perspective view of a connecting portion between a trunk line and a branch line according to a connecting example 3. FIG. 33 is a side view of the connecting example 3 when the connecting portion between the trunk and branch lines is viewed in cross section.

As shown in FIGS. 32 and 33, in the connecting example 3, a groove part 47 is formed in a trunk line 21. The groove part 47 includes, in its middle portion in the depth direction, locking projections 47a which project in directions toward each other. Also, in the connecting example 3 as well, a connecting terminal 90 is connected to the branch line 71.

In the connecting example 3, the connecting plate part 91 of the connecting terminal 90 connected to the branch line 71 is inserted into the groove part 47 of the trunk line 21. Accordingly, the connecting plate part 91 is engaged into the groove part 47, and the locking projections 47a of the groove part 47 are inserted into the hole 92 of the connecting plate part 91 to lock it, whereby the trunk lines 21 of the trunk harness 11 and the branch lines 71 of the branch harness 12 are electrically connected together.

Connecting Example 4

Figure 34:
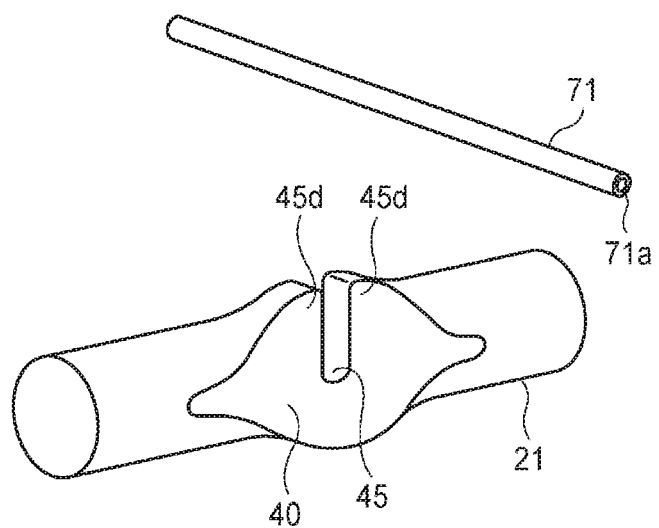
FIG. 34 is a perspective view of a connecting portion between a trunk line and a branch line according to a connecting example 4.

FIG. 34 is a perspective view of a connecting portion between a trunk line and a branch line according to a connecting example 4.

As shown in FIG. 34, in the connecting example 4, a cut-out portion 45 is formed in the flat-shaped connecting part 40 of the trunk line 21. The cut-out portion 45 is configured such that the mutually opposed edges thereof are formed as press-contact blades 45d the mutually opposed edges of which are gradually reduced in thickness.

In the connecting example 4, the branch line 71 is pressed into the cut-out portion 45 of the trunk line 21. Accordingly, the coating 71a of the branch line 71 is cut by the press-contact blades 45d of the cut-out portion 45 and, further, the press-contact blades 45d bite into the conductor of the branch line 71, whereby the trunk lines 21 of the trunk harness 11 and the branch lines 71 of the branch harness 12 are electrically connected together.

Connecting Example 5

Figure 35:
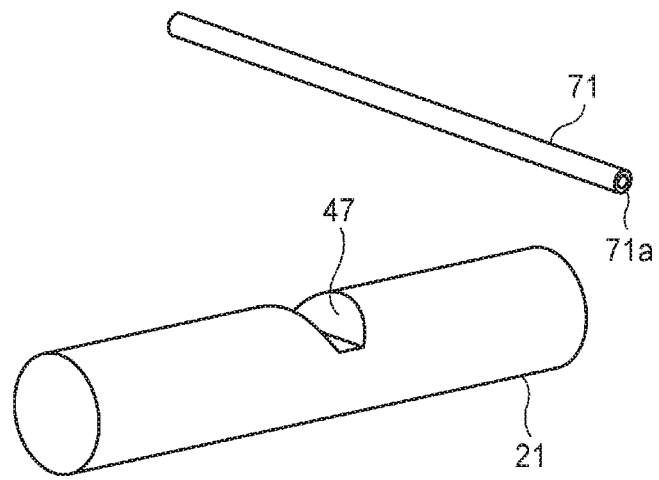
FIG. 35 is a perspective view of a connecting portion between a trunk line and a branch line according to a connecting example 5.
Figure 36:
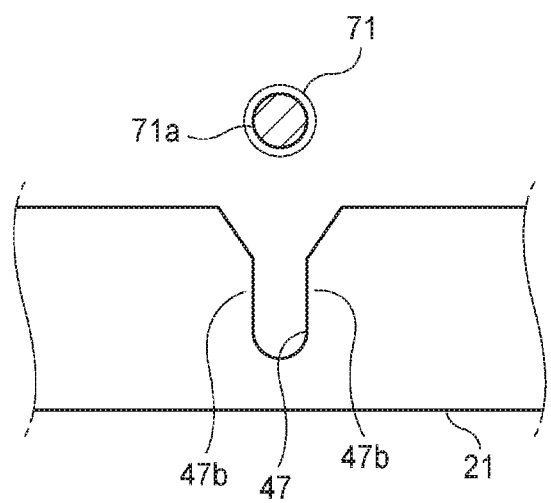
FIG. 36 is a side section view of the branch line in the connecting portion between the trunk line and branch line according to the connecting example 5.

FIG. 35 is a perspective view of a connecting portion between a trunk line and a branch line according to a connecting example 5. FIG. 36 is a side section view of the branch line in the connecting portion between the trunk line and branch line according to the connecting example 5.

As shown in FIGS. 35 and 36, in the connecting example 5, a groove part 47 is formed in the trunk line 21. The groove part 47 includes press-contact blades 47b formed in its central portion in the width direction so as to extend along the depth direction.

In the connecting example 5, the branch line 71 is pressed into the groove part 47 of the trunk line 21. Accordingly, the coating 71a of the branch line 71 is cut by the press-contact blades 47b of the groove part 47 and, further, the press-contact blades 47b bite into the conductor of the branch line 71, whereby the trunk lines 21 of the trunk harness 11 and the branch lines 71 of the branch harness 12 are electrically connected together.

As described above, according to the connecting examples 1~5 for connecting together the trunk lines 21 and branch lines 71, the branch lines 71 can be connected to the trunk lines 21 through the connecting terminal 90 or directly, thereby enabling enhancement in the workability of the operation to connect the branch harness 12 to the trunk harness 11.

Here, the invention is not limited to the above embodiments but can be modified or improved properly. Also, the materials, shapes, dimensions, number, arrangement positions etc. of the composing elements of the above embodiments are arbitrary but not limitative as long as they can attain the invention.

For example, in the above embodiments, as the trunk lines 21 constituting the trunk harness 11, there are used round bars. However, the round bars are not limitative but square bars may also be used. Here, since the round bars can be easily bent in any direction, up, down, left, and right, they may preferably be used as the trunk lines 21 constituting the trunk harness 11.

Also, in the trunk line 21, when connecting to the branch line 71, the previously provided coating 21a thereof may be removed and their connecting portion may be exposed, or the coating 21a may be provided in the other portions of the trunk line 21 than the connecting portion in a post-process.

Here, the flat-shaped connecting part 40, 80 formed in the trunk line 21 may preferably be arranged along a direction perpendicular to the arrangement direction of the trunk line 21. However, it may be arranged along a direction crossing the arrangement direction of the trunk line 21.

Now, the characteristics of the above embodiments of the branch structure and wire harness according to the invention are briefly summarized in the following [1] to [4].

[1] A branch structure in which a branch harness (12) is connected to a trunk harness (11) comprising:
connecting terminals (50, 50B),
wherein the trunk harness (11) includes a plurality of trunk lines (21) parallel-arranged and composed of routing materials with bar conductors,
wherein the branch harness (12) includes a plurality of branch lines (71),
wherein the connecting terminals (50, 50B) are respectively connected to the plurality of the trunk lines (21), so as to electrically connect the plurality of the branch lines (71) to the plurality of the trunk lines (21) respectively,
wherein the trunk lines (21) include connecting parts (40) recessed in a radial direction,
wherein the connecting parts (40) are arranged along an arrangement direction of the plurality of the trunk lines (21), and
wherein the connecting terminals (50, 50B) respectively includes connecting plate parts (51) connected to the connecting parts (40) in surface contact.

[2] The branch structure according to the above described [1],
wherein the connecting terminals (50) are mounted on a circuit board (60) arranged along the arrangement direction of the plurality of the trunk lines (21), and
wherein a first connector (62) mounted on the circuit board (60) is connected to a second connector (a branch side connector 70) on the branch harness (12) and the connecting terminals (50) are conducted to the plurality of the branch lines (71).

[3] The branch structure according to the above described [1],
wherein the connecting terminals (50B) respectively include bus bar parts (53) extending from the connecting plate parts (51) along the arrangement direction of the plurality of the trunk lines (21) and,
wherein a third connector (62) mounted in the ends of the bus bar parts (53) is connected to a second connector (a branch side connector 70) on the branch harness (12) and the connecting terminals (50B) are conducted to the plurality of the branch lines (71).

[4] A wire harness comprising:
a trunk harness (11) including at least a power supply line (21) arranged on a vehicle body;
the branch harness (12) connected to an auxiliary equipment of a vehicle; and
the plurality of control boxes (100) arranged dispersedly along the trunk harness,
wherein the plurality of the control boxes (100) respectively includes control parts which distribute the power of the power supply line to the branch harness (12) connected to the trunk harness (11), and
wherein the plurality of the control boxes (100) connect the branch harness (12) to the trunk harness (11) in the branch structure according to any one of the above described [1] to [3].

DESCRIPTION OF REFERENCE NUMERALS AND SIGNS

1: Vehicle body
10: Wire harness
11: Trunk harness
12: Branch harness
21: Trunk line
40, 80: Connecting part
45, 85: Cut-out portion
50, 50B: Connecting terminal
51: Connecting plate part
53: Bus bar part
60: Circuit board
62: Connector
67, 69: Cut-out portion
70: Branch side connector (connector)
71: Branch line
100A: Branch box (control box)

What is claimed is:

1. A branch structure in which a branch harness is connected to a trunk harness comprising:
    connecting terminals,
    wherein the trunk harness includes a plurality of trunk lines which are parallel-arranged,
    wherein the branch harness includes a plurality of branch lines,
    wherein the connecting terminals are respectively connected to the plurality of the trunk lines so as to electrically connect the plurality of the branch lines to the plurality of the trunk lines respectively,
    wherein the trunk lines include connecting parts recessed in a radial direction,
    wherein the connecting parts are arranged along an arrangement direction of the plurality of the trunk lines,
    wherein the connecting terminals respectively include connecting plate parts connected to the connecting parts in surface contact, and
    wherein the connecting plate parts respectively connect the connecting parts only at one side of the connecting parts in the arrangement direction.

2. The branch structure according to claim 1,
    wherein the connecting terminals are mounted on a circuit board arranged along the arrangement direction of the plurality of the trunk lines, and
    wherein a first connector mounted on the circuit board is connected to a second connector on the branch harness and the connecting terminals are conducted to the plurality of the branch lines.

3. The branch structure according to claim 1,
wherein the connecting terminals respectively include bus bar parts extending from the connecting plate parts along the arrangement direction of the plurality of the trunk lines and,
wherein a third connector mounted in the ends of the bus bar parts is connected to a second connector on the branch harness and the connecting terminals are conducted to the plurality of the branch lines.

4. The branch structure according to claim 1, wherein the connecting parts are recessed in the radial direction to form flat surfaces, and
wherein the connecting terminals respectively include the connecting plate parts including flat surfaces connected to the flat surfaces of the connecting parts.

5. A wire harness comprising:
a trunk harness including at least a power supply line arranged on a vehicle body;
a branch harness connected to an auxiliary equipment of a vehicle; and
a plurality of control boxes arranged dispersedly along the trunk harness,
wherein the plurality of the control boxes respectively includes control parts which distribute the power of the power supply line to the branch harness connected to the trunk harness, and
wherein the plurality of the control boxes connect the branch harness to the trunk harness in the branch structure according to claim 1.

* * * * *